(12) United States Patent
Maki

(10) Patent No.: US 7,519,250 B2
(45) Date of Patent: Apr. 14, 2009

(54) OPTICAL SWITCHES

(75) Inventor: Jeffery J. Maki, Fremont, CA (US)

(73) Assignee: Dynamic Method Enterprises Limited, Hong Kong (HK)

( * ) Notice: Subject to any disclaimer, the term of this patent is extended or adjusted under 35 U.S.C. 154(b) by 0 days.

(21) Appl. No.: 12/137,495

(22) Filed: Jun. 11, 2008

(65) Prior Publication Data

US 2008/0292240 A1    Nov. 27, 2008

Related U.S. Application Data

(62) Division of application No. 11/215,068, filed on Aug. 29, 2005, now Pat. No. 7,397,989.

(60) Provisional application No. 60/611,927, filed on Sep. 21, 2004.

(51) Int. Cl.
G02B 6/12 (2006.01)
G02B 6/26 (2006.01)

(52) U.S. Cl. .............................. 385/40; 385/18; 385/16

(58) Field of Classification Search .................. 385/40, 385/18, 16
See application file for complete search history.

(56) References Cited

U.S. PATENT DOCUMENTS

| | | | |
|---|---|---|---|
| 4,124,270 A * | 11/1978 | Cheo | 385/130 |
| 4,285,569 A * | 8/1981 | Yao et al. | 385/10 |
| 4,645,293 A * | 2/1987 | Yoshida et al. | 385/40 |
| 4,693,547 A | 9/1987 | Soref et al. | |
| 4,728,167 A | 3/1988 | Soref et al. | |
| 4,730,884 A | 3/1988 | Seino et al. | |
| 4,746,183 A | 5/1988 | Soref et al. | |
| 4,784,451 A | 11/1988 | Nakamura et al. | |
| 5,033,811 A * | 7/1991 | Yanagawa et al. | 385/16 |
| 5,148,505 A * | 9/1992 | Yanagawa et al. | 385/16 |
| 5,255,334 A * | 10/1993 | Mak et al. | 385/41 |
| 5,369,718 A | 11/1994 | Kamata et al. | |
| 5,438,637 A * | 8/1995 | Nilsson et al. | 385/10 |
| 5,490,226 A * | 2/1996 | Nelson | 385/16 |
| 5,574,808 A * | 11/1996 | van der Tol | 385/28 |
| 5,754,714 A * | 5/1998 | Suzuki et al. | 385/5 |
| 5,818,983 A * | 10/1998 | Yoshimura et al. | 385/14 |

(Continued)

FOREIGN PATENT DOCUMENTS

EP    0233011 B1    9/1992

OTHER PUBLICATIONS

J. Lousteau, et al., "The Single-Mode Condition For Silicon-On-Insulator Optical Rib Waveguides With Large Cross Section", Journal of Lightwave Technology, vol. 22, No. 8, Aug. 2004. pp. 1923-1929.

*Primary Examiner*—K. Cyrus Kianni
(74) *Attorney, Agent, or Firm*—Blakely, Sokoloff, Taylor & Zafman LLP

(57) ABSTRACT

Optical switches are described herein. In one embodiment, an exemplary optical switch includes, but is not limited to, a first waveguide, a second waveguide across with the first waveguide in an angle to form an intersection, and a pair of electrodes placed within a proximity of the intersection to switch a light traveling from the first waveguide to the second waveguide, where the intersection includes a geometry that supports single and multimode propagation. Other methods and apparatuses are also described.

15 Claims, 44 Drawing Sheets

U.S. PATENT DOCUMENTS

| | | | |
|---|---|---|---|
| 5,937,113 A * | 8/1999 | He et al. ................... 385/11 |
| 6,567,573 B1 * | 5/2003 | Domash et al. ............. 385/16 |
| 6,693,736 B1 * | 2/2004 | Yoshimura et al. ......... 359/333 |
| 6,771,857 B1 * | 8/2004 | Domash et al. ............. 385/37 |
| 6,778,736 B2 | 8/2004 | Markwardt et al. |
| 6,810,166 B2 * | 10/2004 | Baumann et al. ............ 385/22 |
| 7,003,181 B2 * | 2/2006 | Domash et al. ............. 385/10 |
| 7,203,403 B2 * | 4/2007 | Gunn, III .................... 385/50 |
| 2004/0096146 A1 * | 5/2004 | Baumann et al. ............ 385/22 |

* cited by examiner

OPTICAL SWITCHES

RELATED APPLICATIONS

This application is a divisional of U.S. patent application Ser. No. 11/215,068, filed Aug. 29, 2005 now U.S. Pat. No. 7,397,989, which claims the benefit of U.S. Provisional Application No. 60/611,927, filed Sep. 21, 2004, which is incorporated by reference herein by its entirety.

FIELD OF THE INVENTION

The present invention relates generally to fiber optics. More particularly, this invention relates to an optical switch.

BACKGROUND OF THE INVENTION

Integrated optical switches have been widely used recently. To divert light from one waveguide to another, the waveguides are coupled by specific geometric arrangements of the two waveguides in relation to each other, where the coupling is modified by local electro-optical manipulation of their indices of refraction. Typical examples of electro-optical switches include the Mach-Zehnder interferometer 2×2 switch, the directional coupler 2×2 switch, the modal-interference 2×2 switch (e.g., two-mode interference switch, bifurcation optical active switch), the mode-evolution 2×2 switch, the imbalanced y-branch 1×2 switch, the digital-optical switch, and the total internal reflection (TIR) X-switch. Depending on the voltage applied to such switches or in some cases the electrical current actually, light is thus partly or completely diverted from an input waveguide to an output waveguide.

By appropriately combining waveguides and switches, a switch fabric (also referred to as switch matrix) is formed to switch light from multiple input waveguides among multiple output waveguides. A variety of switch fabric geometries have been used. Switch fabrics based on geometries such as crossbar geometry can be used to divert input signals to output channels arbitrarily. Signals from any input channels can be directed to any output channel, and even to multiple output channels, in broadcast and multicast transmission modes.

A typical switch employs the thermo-optic effect in a localized manner to control the refractive index within polymer waveguide structures to switch and attenuate the optical signals, which may limit the switching speed of the switch. Further, there has been a lack of commercially available switches possessing microsecond operation that have integrated variable optical attenuators and integrated optical power monitoring. The lack of integrated power monitoring means external components are required, which makes the overall approach more cumbersome and bulky.

SUMMARY OF THE INVENTION

Optical switches are described herein. In one embodiment, an exemplary optical switch includes, but is not limited to, a first waveguide, a second waveguide across with the first waveguide in an angle to form an intersection, and a pair of electrodes placed within a proximity of the intersection to switch a light traveling from the first waveguide to the second waveguide, where the intersection includes a geometry that supports single and multimode propagation. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Optical switches matrix are described herein. In the following description, numerous specific details are set forth (e.g., such as logic resource partitioning/sharing/duplication implementations, types and interrelationships of system components, and logic partitioning/integration choices). However, it is understood that embodiments of the invention may be practiced without these specific details. In other instances, well-known circuits, software instruction sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other (e.g., physically, electrically, optically, etc.). "Coupled" may similarly mean that two or more elements are in direct contact (physically, electrically, optically, etc.). However, "coupled" may alternatively mean that two or more elements are not in direct contact with each other, but yet still co-operate or interact with each other.

Figure 1:
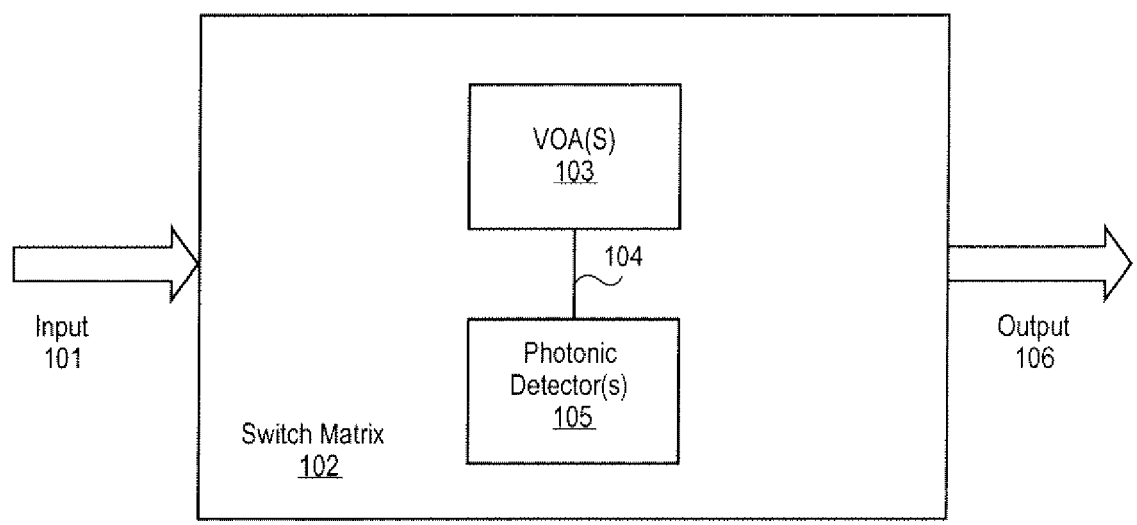
FIG. 1 is a block diagram illustrating an exemplary optical switch fabric according to one embodiment of the invention.

FIG. 1 is a block diagram illustrating an exemplary optical switch fabric according to one embodiment of the invention. Referring to FIG. 1, exemplary switch fabric 100 includes, but is not limited to, an optical switch matrix (also referred to as an optical switch array) 102 having multiple switching elements to receive multiple input optical fibers 101, one or more variable optical attenuators (VOAs) 103, and one or more photonic detectors 105 to monitor, via one or more tap mechanisms 104, the optical signals traveling along multiple output optical fibers 106.

In one embodiment, the switch matrix 102 may be an 8×8 switch matrix that routes any one of the optical signals received by the input fibers 101 to any one of the output fibers 106 using multiple optoelectrical switches, such as, for example, directional couplers, BOA couplers, digital-optical-switches, and X or Y switches. In a typical embodiment, the switches (also referred to as optical cross-connect switches, switching elements, switching nodes, and/or switches) employed in the exemplary switch matrix 102 may be able to perform one microsecond operation (or shorter in time) with fully integrated variable optical attenuation and output optical power monitoring, which enables constant output power operation over multiple channels. In one embodiment, the switches employed within the switch matrix 102 may be manufactured using a semiconductor material (e.g., silicon or the like) and local manipulation of the refractive index by the carrier-induced plasma effect generated by appropriately placed electrodes and current injected from the application of a forward-biased voltage (closely related are the Pockels and Kerr effects that rely upon strong electric fields rather than strong electrical currents).

The switches may possess multiple functionality, such as, for example, attenuation, and power monitoring, etc. For example, according to one embodiment, at least one of the switching elements that make up the switching matrix may be capable of partially switching to divert a portion of an optical signal to one output port while routing the remaining portion of the optical signal to another output port. Note that although components 102-104 are shown as separate functional blocks, it will be appreciated that these components are integrated within each other on a single substrate (e.g., single integrated chip).

Figure 2:
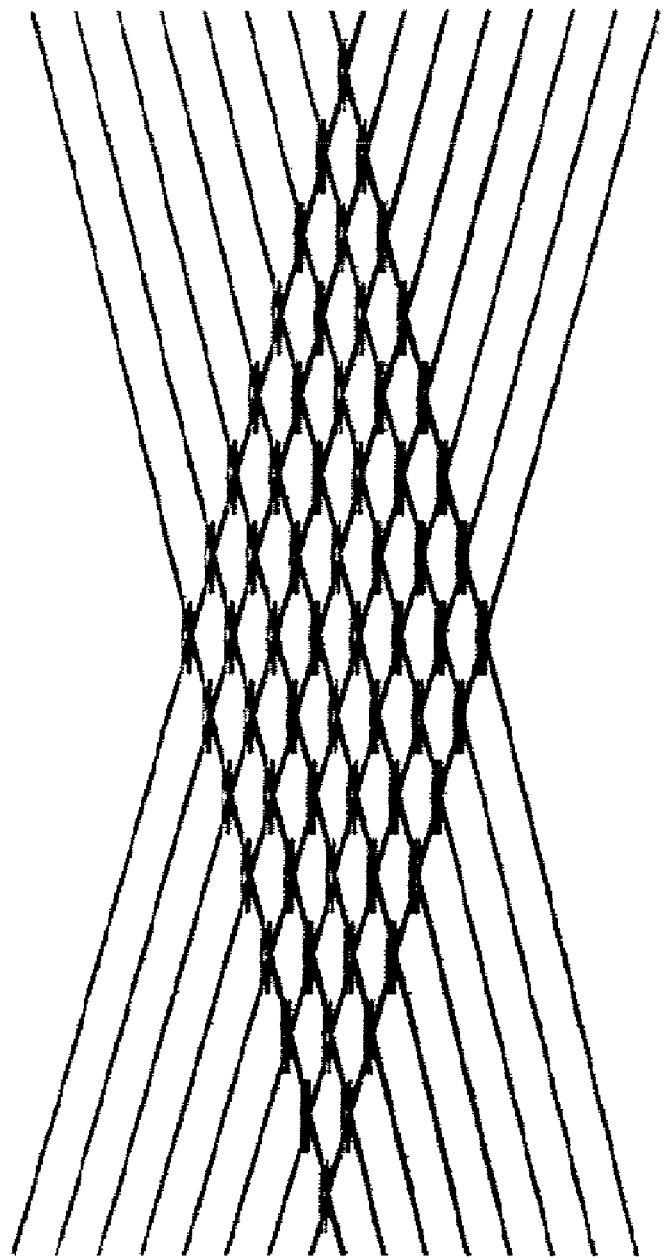
FIG. 2 is a diagram illustrating an exemplary layout of an optical switch matrix according to one embodiment of the invention.

FIG. 2 is a diagram illustrating an exemplary layout of an optical switch matrix according to one embodiment of the invention. In this embodiment, a crossbar architecture is employed. A 2×2 TIR (total internal reflection) X-Switch enables directly any of the architectures that possess a matrix layout of intersecting "rows" and "columns" of waveguides. In a particular embodiment, the exemplary crossbar architecture is designed based on the TIR X-Switch for a pitch of 127 μm, where each switch employs dual electrodes.

Figure 3:
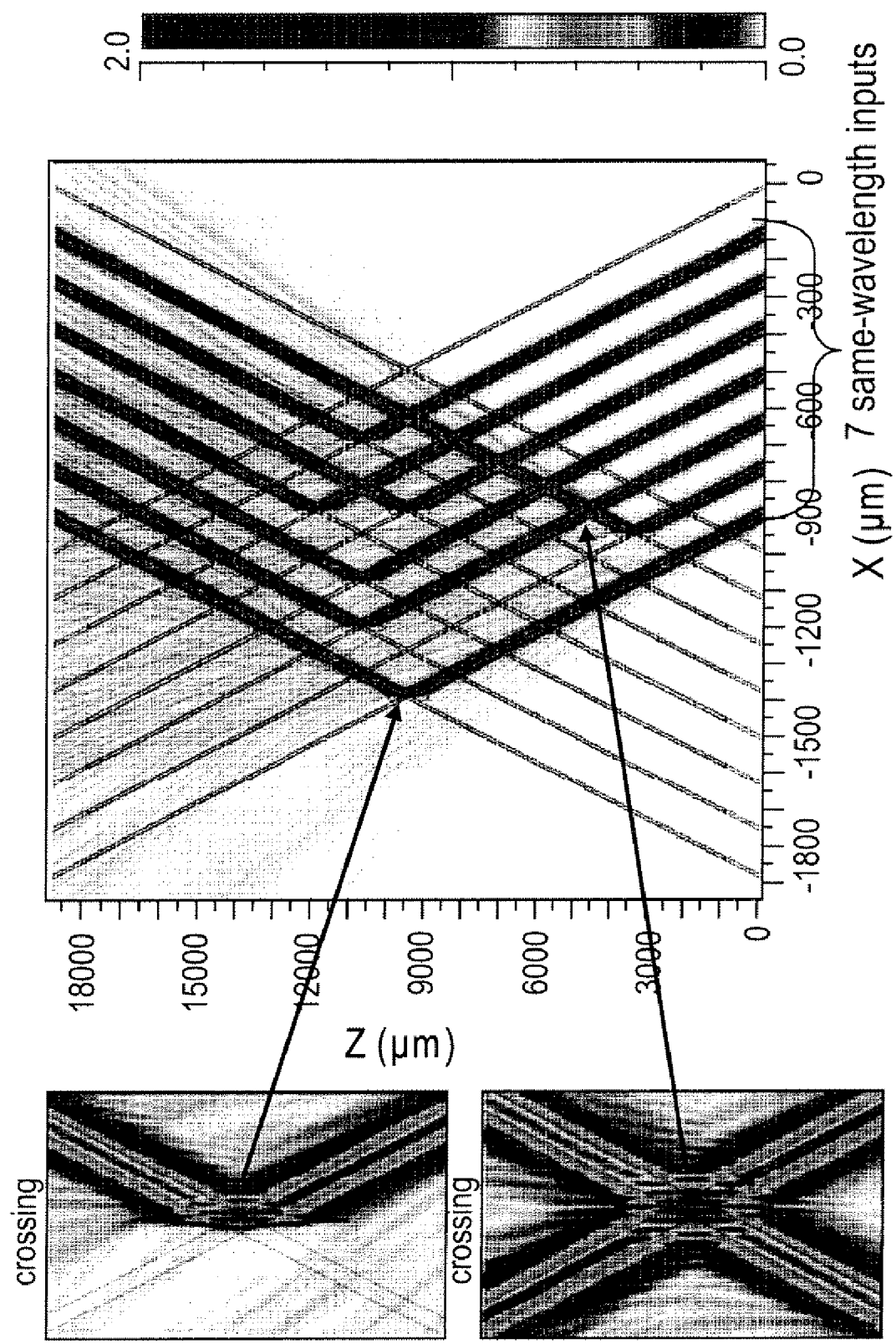
FIG. 3 is a diagram illustrating an exemplary switching performance of a switch matrix according to one embodiment.

FIG. 3 is a diagram illustrating an exemplary switching performance of a switch matrix according to one embodiment. In this embodiment, as an example, optical signals are applied to seven of the inputs, but they may be applied to some or all eight inputs. Note that FIGS. 2 and 3 are shown for illustrating purposes only. The techniques described herein may be applied to a variety of switch matrix having different layouts. Further detailed information regarding layouts of a switch matrix may be found in a co-pending U.S. patent application Ser. No. 10/867,948, entitled "Optical Switch Matrix", filed Jun. 14, 2004, assigned to a common assignee of the present application, which is hereby incorporated by reference.

In one embodiment, the main portion of the physical design is a waveguide chip (e.g., planar lightwave circuit). The complete module may include at least one of the following functional elements and attributes:
waveguide 2×2 switches,
waveguide variable optical attenuators (VOAs), low-loss waveguides,
low-scatter waveguide crossings,
means of tapping the optical signal for optical power monitoring,
integrated photodetectors (end-fire or fiber coupled as alternatives),
multi-fiber optical connections to the multi-waveguide chip,
low-loss optical coupling between SMF fiber and the waveguide chip for input and output,
chip-level electrodes and wire-bond pads, including electrical connects,
wire bonds for package-to-chip electrical connects,
hermetic package presuming the need owing to integrated photodetectors, and
reliability for telecom applications (e.g., GR-1209 and GR-1221 compliance, operating lifetime of 20 years).

Relatively Large Ridge Waveguide TIR X-Switch

In one embodiment, the simulation work may be performed retied on the Soref model for the magnitude of the real and imaginary parts of the refractive index in silicon that can be changed by the presence of charge carriers by current injection. For example, for wavelength $\lambda=1.55$ micron ($\mu$m), for the real part of the refractive-index change, the empirical formula may be illustrated as follows:

$$\Delta n_{Re} = \Delta n_e + \Delta n_h \quad (1)$$
$$= -8.8 \times 10^{-22}(\Delta N_e) - 8.5 \times 10^{-18}(\Delta N_h)^{0.8}$$

For the imaginary-index change expressed as a coefficient of induced absorption in units of $cm^{-1}$, the related formula may be illustrated as follows:

$$\Delta \alpha = \Delta \alpha_e + \Delta \alpha_h \quad (2)$$
$$= 8.5 \times 10^{-18}(\Delta N_e) + 6.0 \times 10^{-18}(\Delta N_h)$$

Figure 4A:
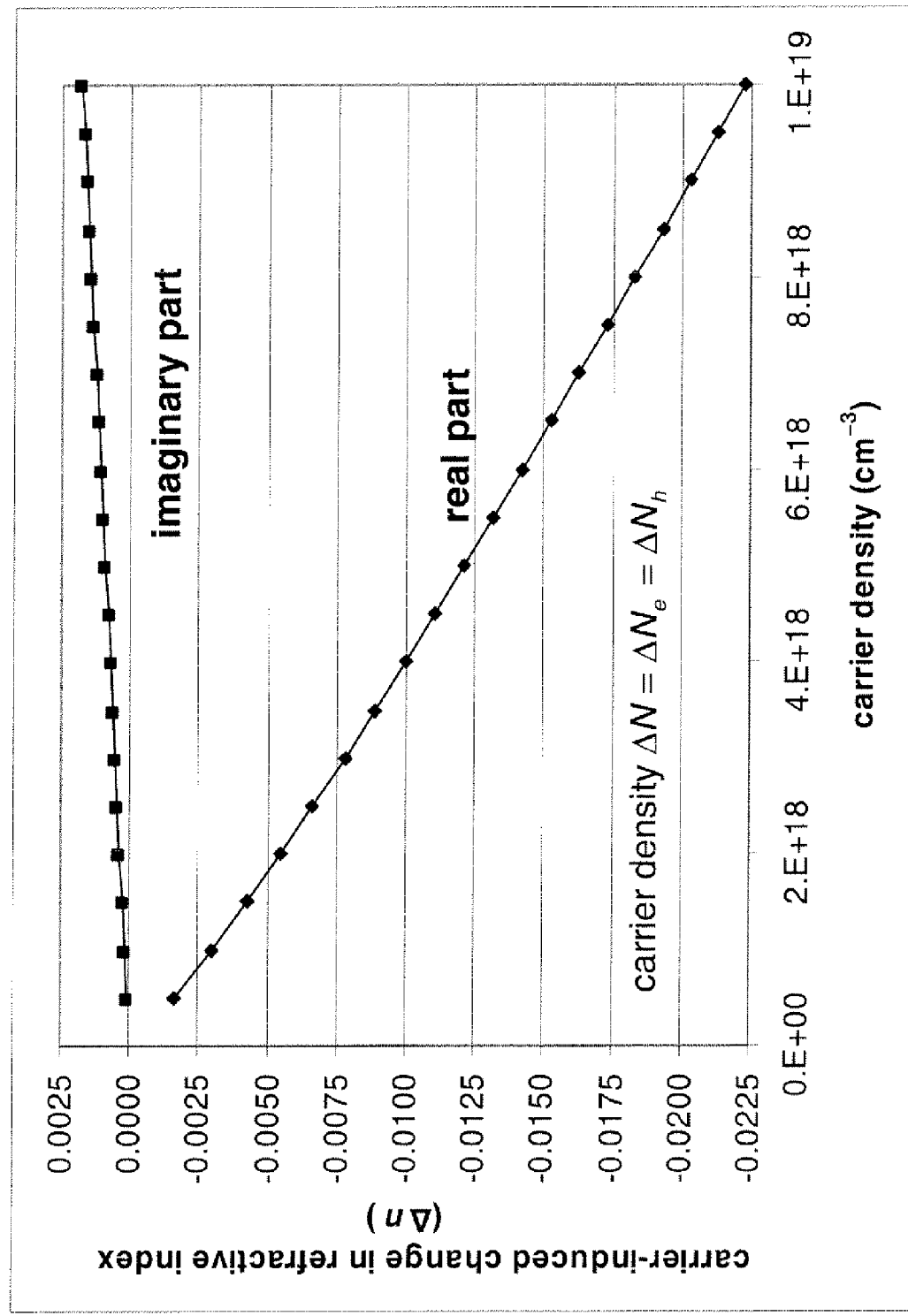
FIG. 4A is a diagram illustrating a plot of the real and imaginary parts of the refractive index change as a function of carrier density according to certain embodiments.
Figure 4B:
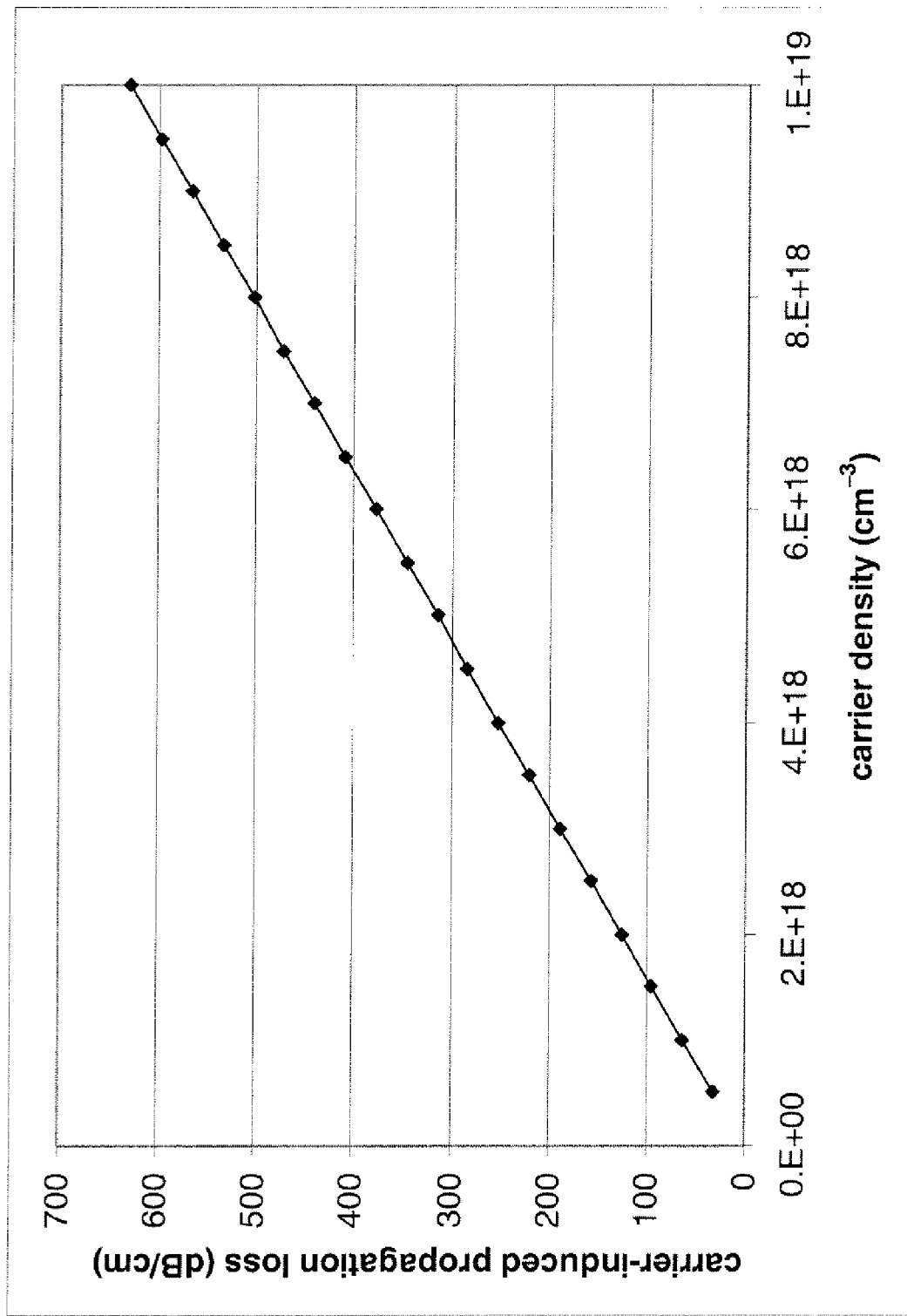
FIG. 4B is a diagram corresponding propagation loss as a factor of carrier density.

FIG. 4A is a diagram illustrating a plot of the real and imaginary parts of the refractive-index change as a function of carrier density corresponding to the above two formulas, where $\Delta n_{Im} = \Delta \alpha (\lambda/4\pi)$. FIG. 4B is a diagram illustrating a plot of the absorption in units of dB/cm as a function of carrier density corresponding to the above formula (2).

Figure 5A:
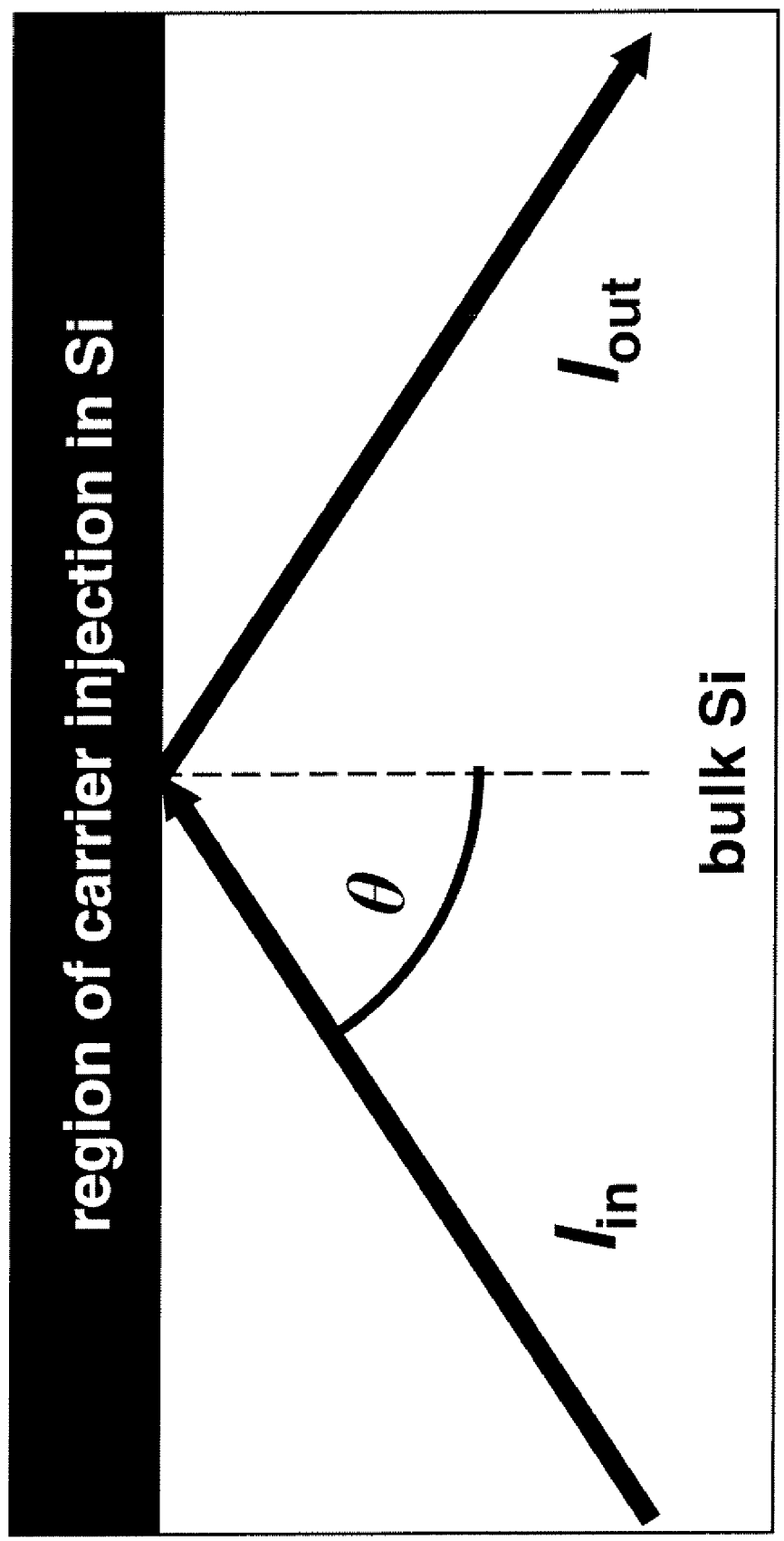
FIG. 5A is a block diagram illustrating a conceptual experiment of TIR according to one embodiment.
Figure 5B:
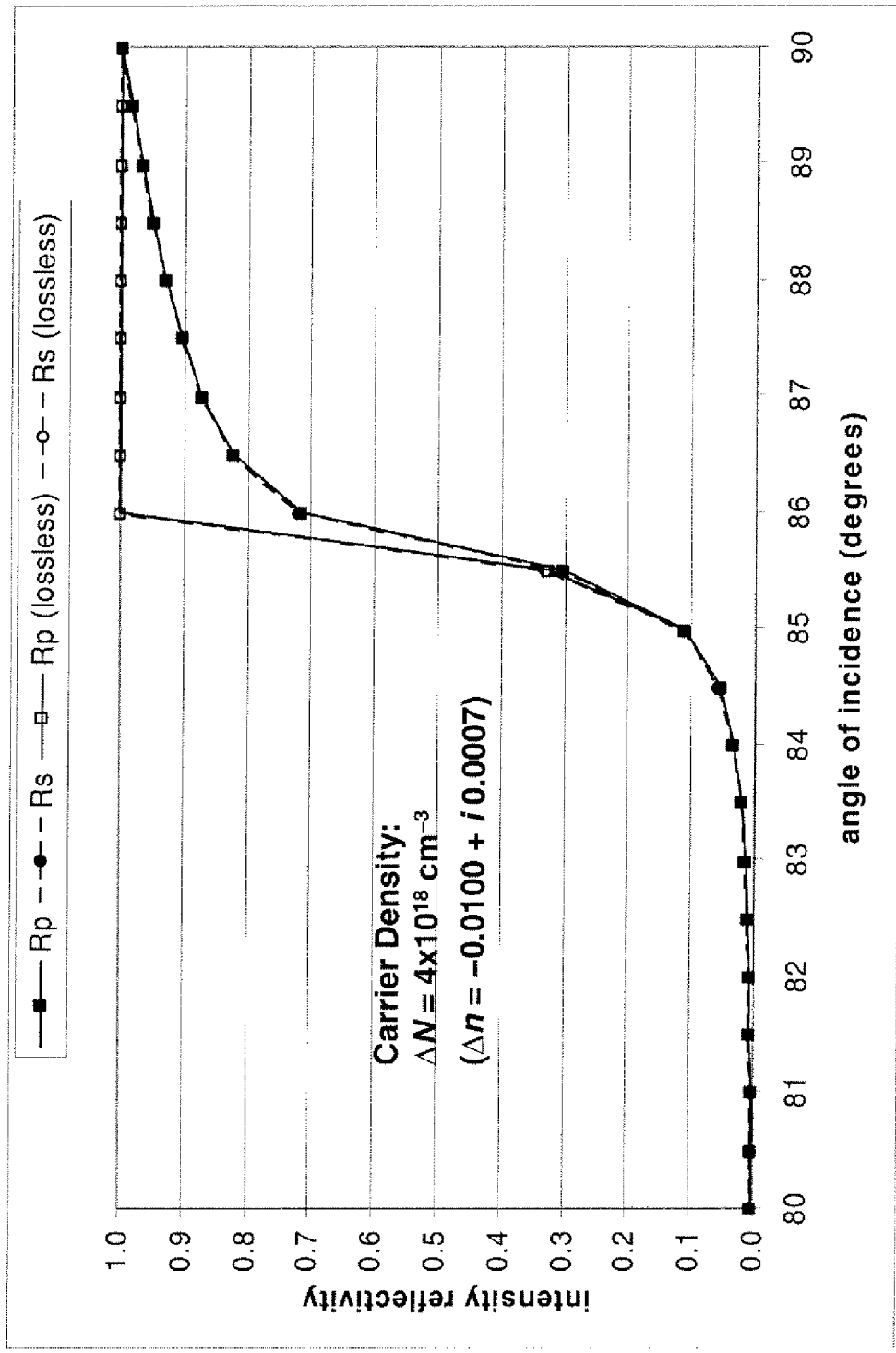
FIG. 5B is a plot of the reflectivity of a step-index boundary with respect to FIG. 5A.

In one embodiments high reflectivity owing to carrier induced index change is needed, where the phenomena employed is total internal reflection (TIR). Measurements are performed to measure the reflectivity of a region of high carrier injection, and to use this measurement of the reflectivity to infer the magnitude of the refractive index change. FIG. 5A is a block diagram illustrating a conceptual experiment of TIR. The reflection is not anticipated to be 100% as for TIR in a loss-less material system, but reduced owing to the presence of a carrier-induced absorption (e.g., an imaginary-part of the refractive index). The plot of the reflectivity of a step-index boundary is shown in FIG. 5B. Referring to FIG. 5B, the standard Fresnel equations is utilized for specular reflection, where the required refractive indices of silicon are taken from the above formulas. As shown in FIG. 5B, intensity reflectivity as a function of the angle of incidence approaching grazing incidence (i.e., approaching 90°) upon a step-index boundary of carrier-induced index change. Note that the absorption owing to carrier injection diminishes the reflectivity from demonstrating total internal reflection (TI) within the silicon.

Slab Waveguide with Drive Electrodes

Figure 9A:
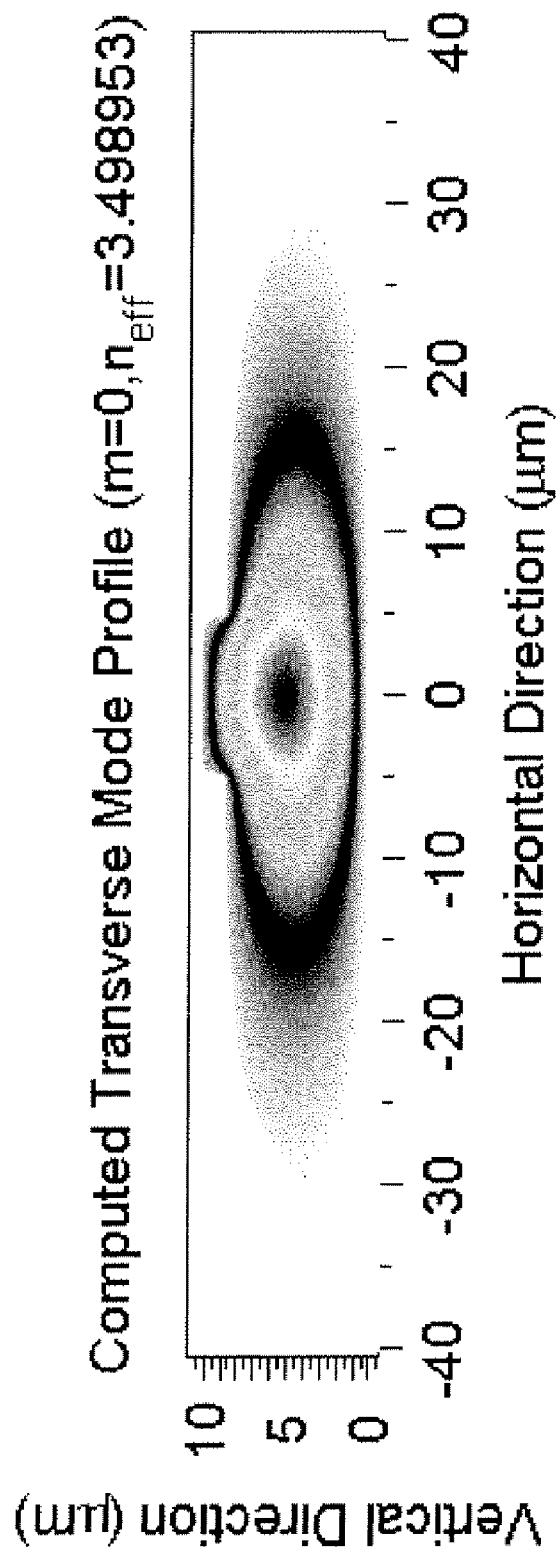
FIGS. 9A and 9B are diagrams illustrating contour plots of the profiles for the semi-vector TE and TM fundamental modes.
Figure 9B:
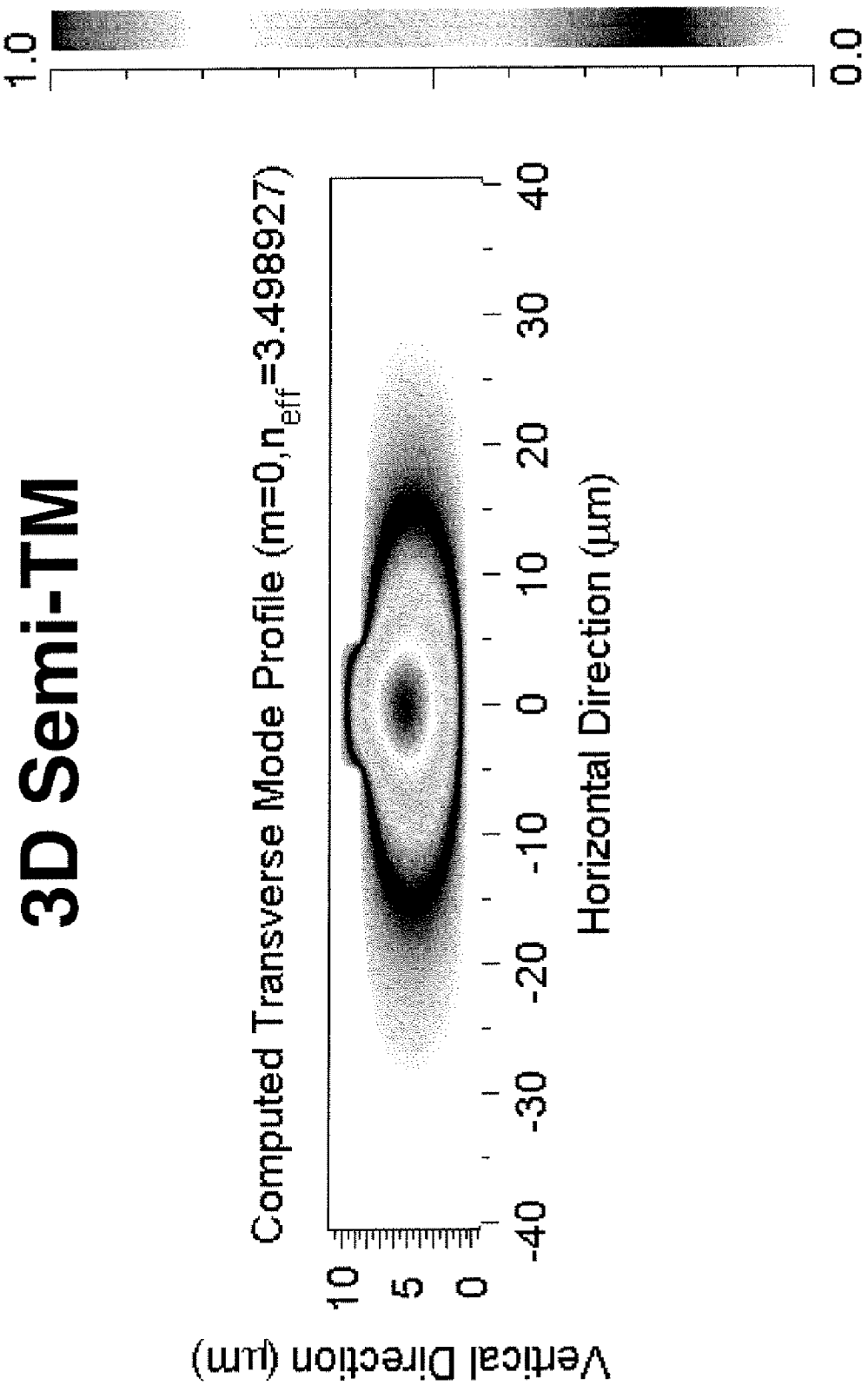

According to one embodiment, electrodes may be used to drive the carrier injection that have edge field effects which lead to index gradients rather than the idealized step-index considered in the previous subsection. In one embodiment, the size scale of these gradients (carrier-diffusion distance) may be designed to match the size scale of the fundamental mode as shown in FIGS. 9A and 9B.

Figure 6A:
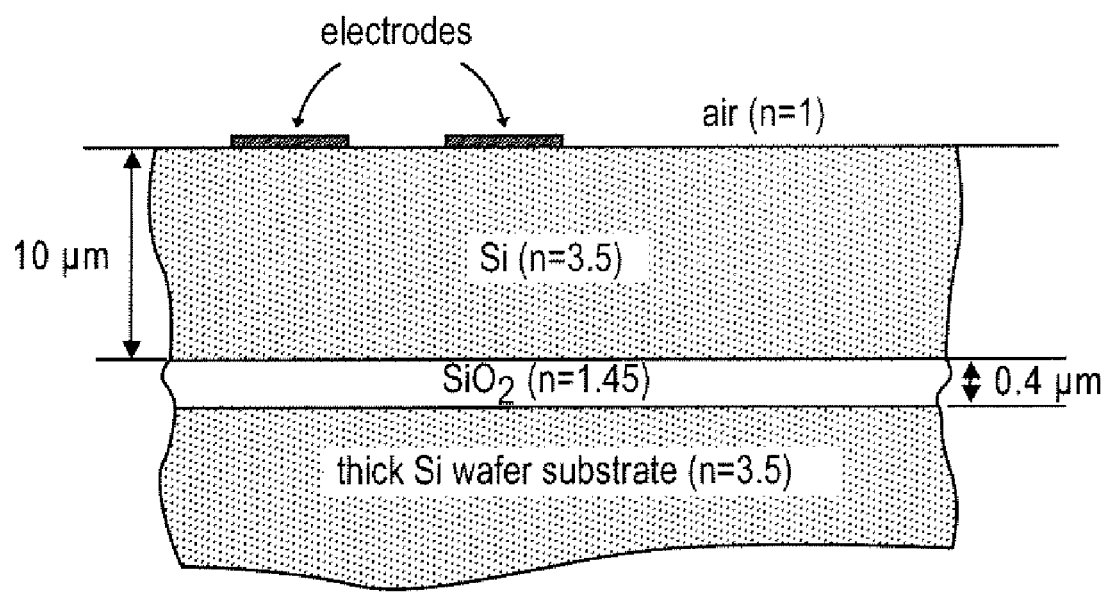
FIGS. 6A and 6B are block diagrams illustrating exemplary optical switches having electrodes according to certain embodiments of the invention.

The gradients of the index change depend upon the specific geometry of the electrode in connection with the geometry of the silicon waveguide. An SOI (silicon on insulator) slab waveguide with coplanar electrodes may be used in design of the TIR X-Switch. FIG. 6A is a block diagram illustrating an exemplary optical switch having coplanar electrodes according to one embodiment of the invention. Note that the size and dimension of FIG. 6A is shown for the purposes of illustration only. Other configurations may be utilized.

Figure 6B:
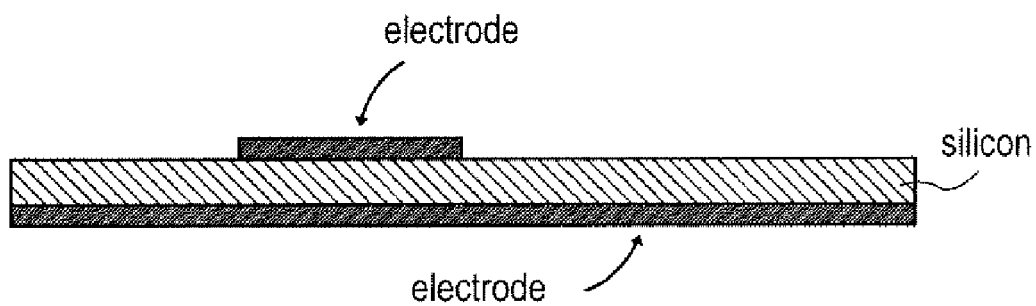

Alternatively, parallel-plate electrode geometry as shown in FIG. 6B may be utilized according to certain embodiments. It is useful to note that under simplifying conditions analytic expressions might be developed to approximate the edge effects (size-scale of the gradients) in the induced index change, which would further enable simplified technical specification of the electrodes and waveguide geometry to produce the phenomena of TIR in silicon.

Figure 7:
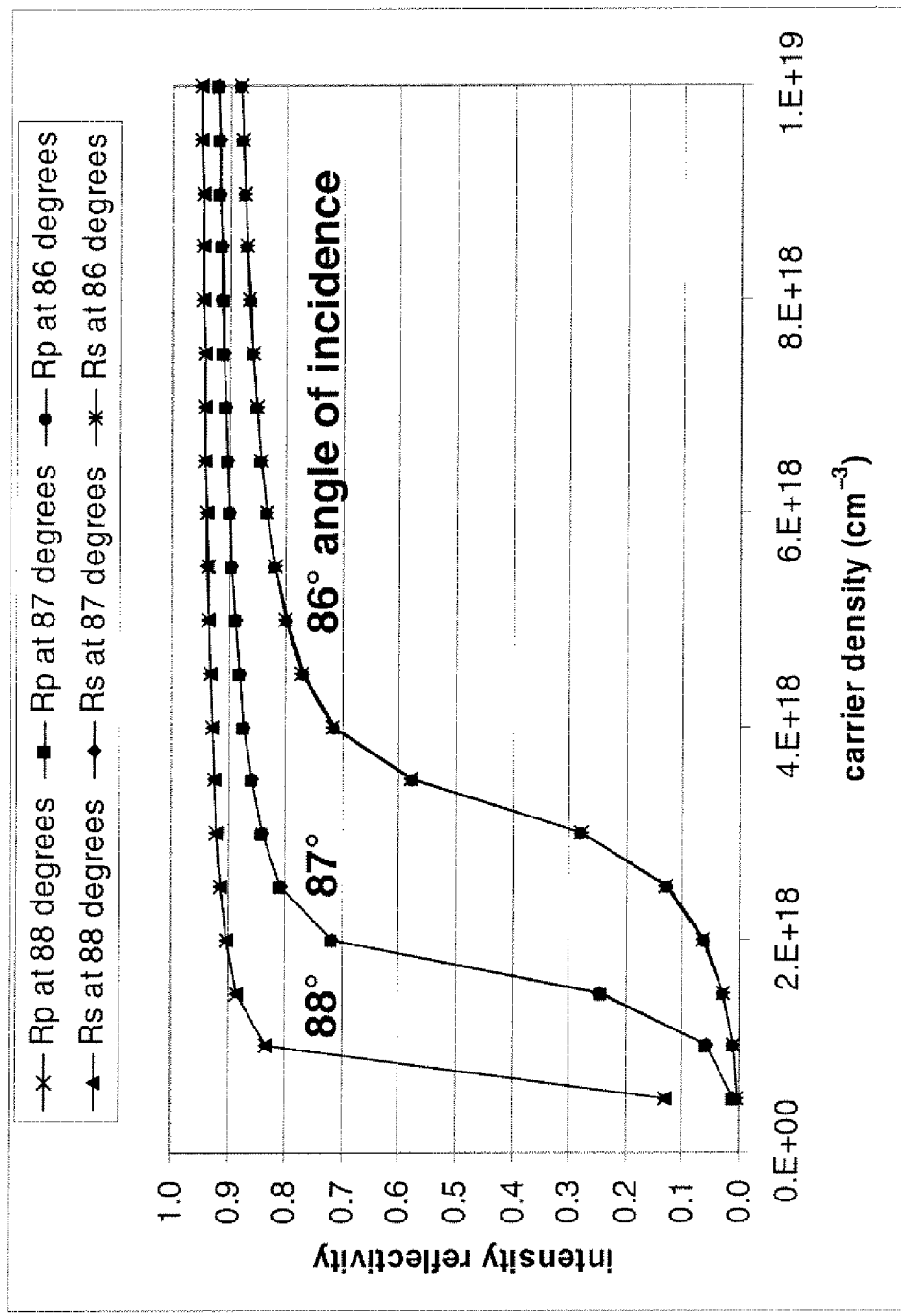
FIG. 7 is a plot illustrating an exemplary performance of optical switches shown in FIGS. 6A and 6B.

Referring back to FIG. 5A, according to one embodiment, the grazing angle may be designed with approximately 3° (e.g., 87° angle of incidence measured from the surface normal), including angles ranging approximately from 1° to 10°. For any angle of grazing incidence, the reflected optical power depends upon the applied bias voltage or, hence, the carrier density N. As the bias voltage (e.g., carrier density) is increased, the reflectivity should be seen to increase. High reflection (e.g., "attenuated" TIR) may occur as the bias setting is further increased beyond some characteristic value for the particular angle of incidence as shown in FIG. 7, which is a diagram illustrating an exemplary plot of intensity reflectivity as a function of the carrier density owing to current injection, according to one embodiment.

Relatively Low-Loss Large-Ridge Waveguide Crossing

Figure 8:
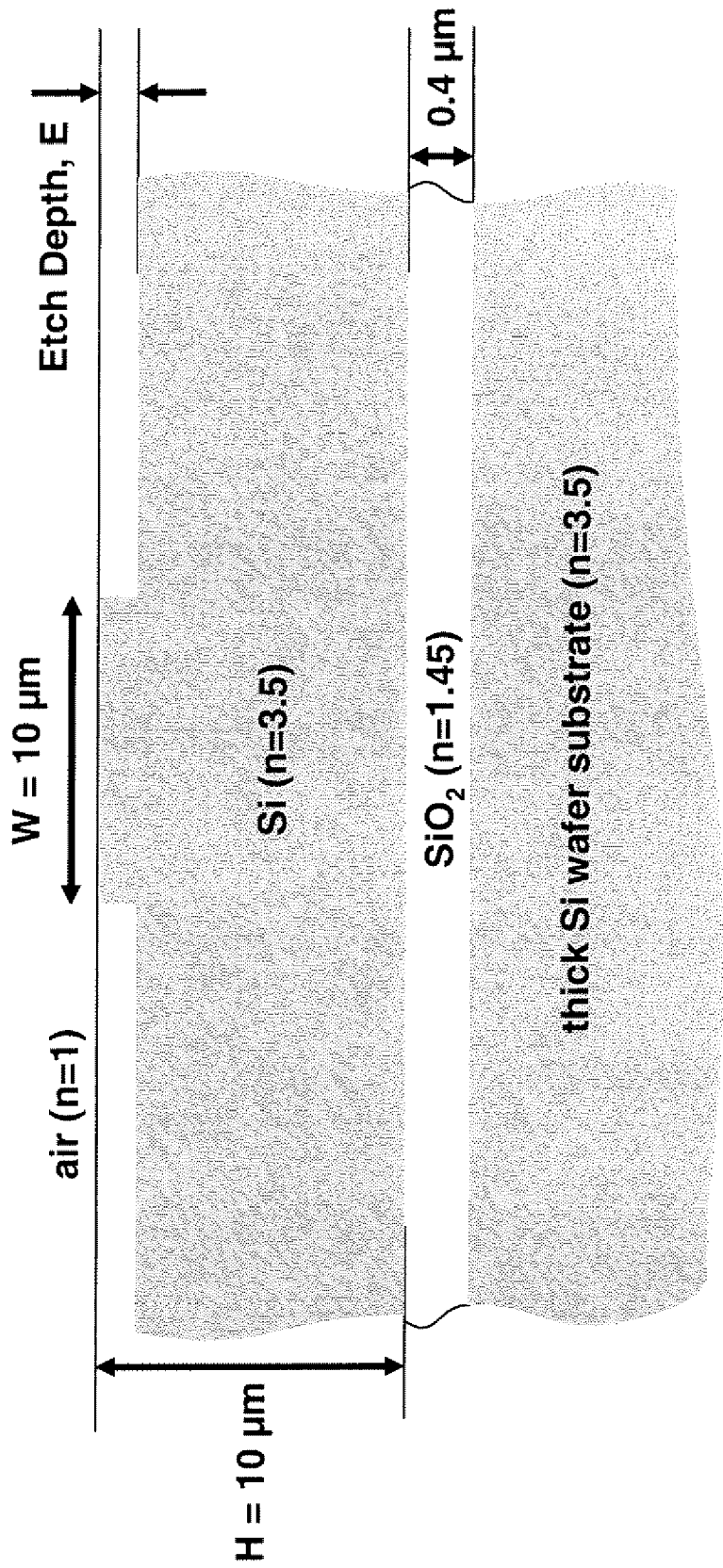
FIG. 8 is a diagram illustrating an exemplary waveguide cross-section of an optical switch according to one embodiment.

According to one embodiment, low-optical-loss waveguide crossings are designed based upon the use of large ridge waveguides. The waveguides are weakly guiding for the fundamental optical mode (e.g., the effective mode index is close to the numerical value for the large-slab waveguide modes). In one embodiment, the preferred material system is silicon on insulator (SOI). FIG. 8 is a diagram illustrating an exemplary waveguide crossing of an optical switch according to one embodiment.

In a particular embodiment, the etch-depth E is approximately 1.5 $\mu$m, where this ranges from approximately 3 $\mu$m down to 1 $\mu$m. In a further embodiment, ridge width W may be approximately 10 $\mu$m and height H may be approximately 10 $\mu$m. The indices of refraction are the known values for pure materials at a wavelength of approximately 1.55 $\mu$m, which persist to be valid for wavelength ranging within the S, C, and L ITU-communication wavelength bands for the optical carrier wave. Note that the parameters used in FIG. 8 are shown for purposes of illustration only. It will be appreciated that other dimensions and/or configurations may also be utilized. FIGS. 9A and 9B are diagrams illustrating contour plots of the profiles for the semi-vector TE and TM fundamental modes.

Figure 10:
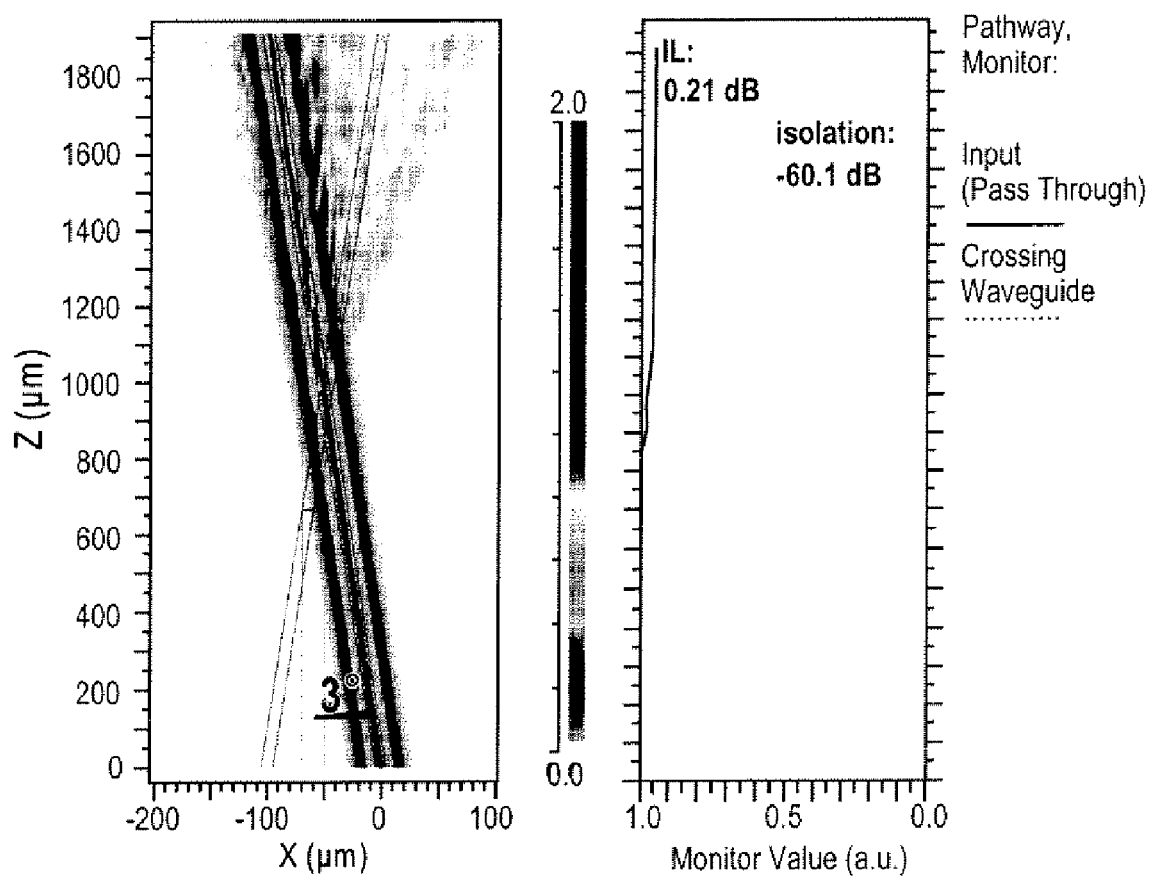
FIG. 10 is a diagram illustrating propagation computed using the beam propagation method (BPM) according to one embodiment.
Figure 11:
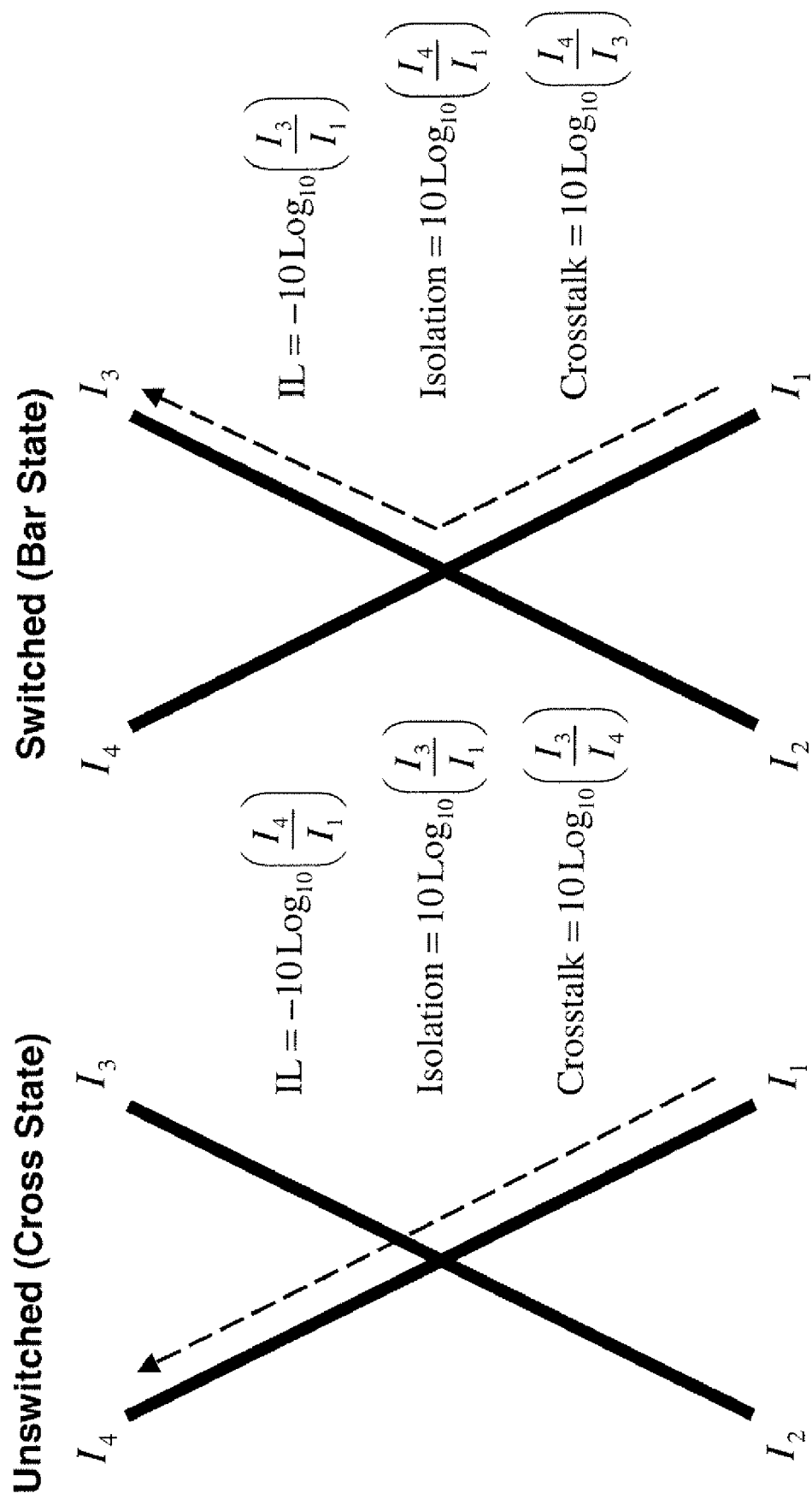
FIG. 11 is a diagram illustrating definitions uses for IL, isolation, and crosstalk according to certain embodiments.

According to one embodiment, the performance of waveguide crossings may be designed based upon this specific SOI ridge waveguide. The propagation computed using the beam propagation method (BPM) is shown in FIG. 10 according to one embodiment. In BeamPROP™ 5 from RSoft Design, Inc., the selected commercial BPM software, file-power monitors measure the optical mode power throughout the waveguide crossing. These file power monitors use the same electric field as is used to form the launch field for the simulations. The resulting insertion loss (IL) is approximately 0.21 dB and the isolation is approximately −60.1 dB. In one embodiment, the isolation may be degraded. The definitions uses for IL, isolation, and crosstalk are shown in FIG. 11.

Figure 12:
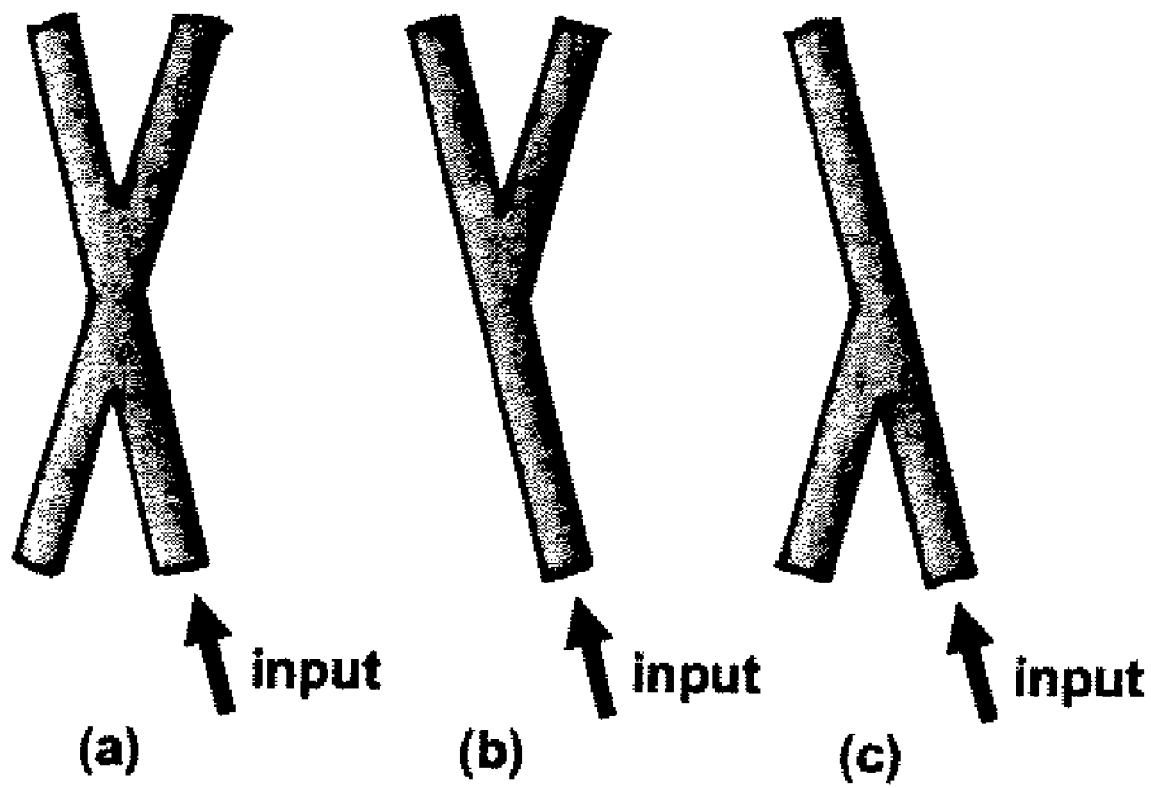
FIG. 12 is a block diagram illustrating exemplary x and asymmetric y-branch switches according to certain embodiments.
Figure 13A:
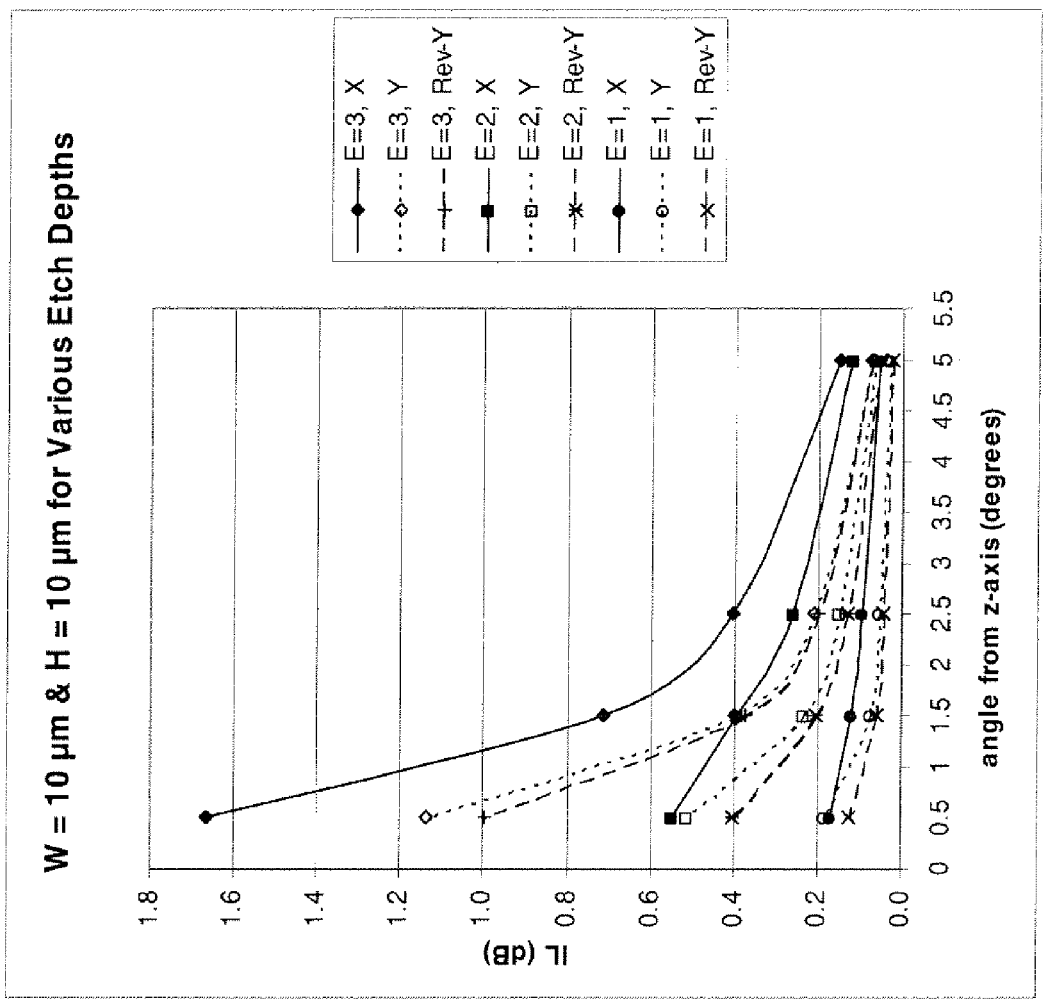
FIGS. 13A and 13B are diagram illustrating numerical simulation results according to certain embodiments.
Figure 13B:
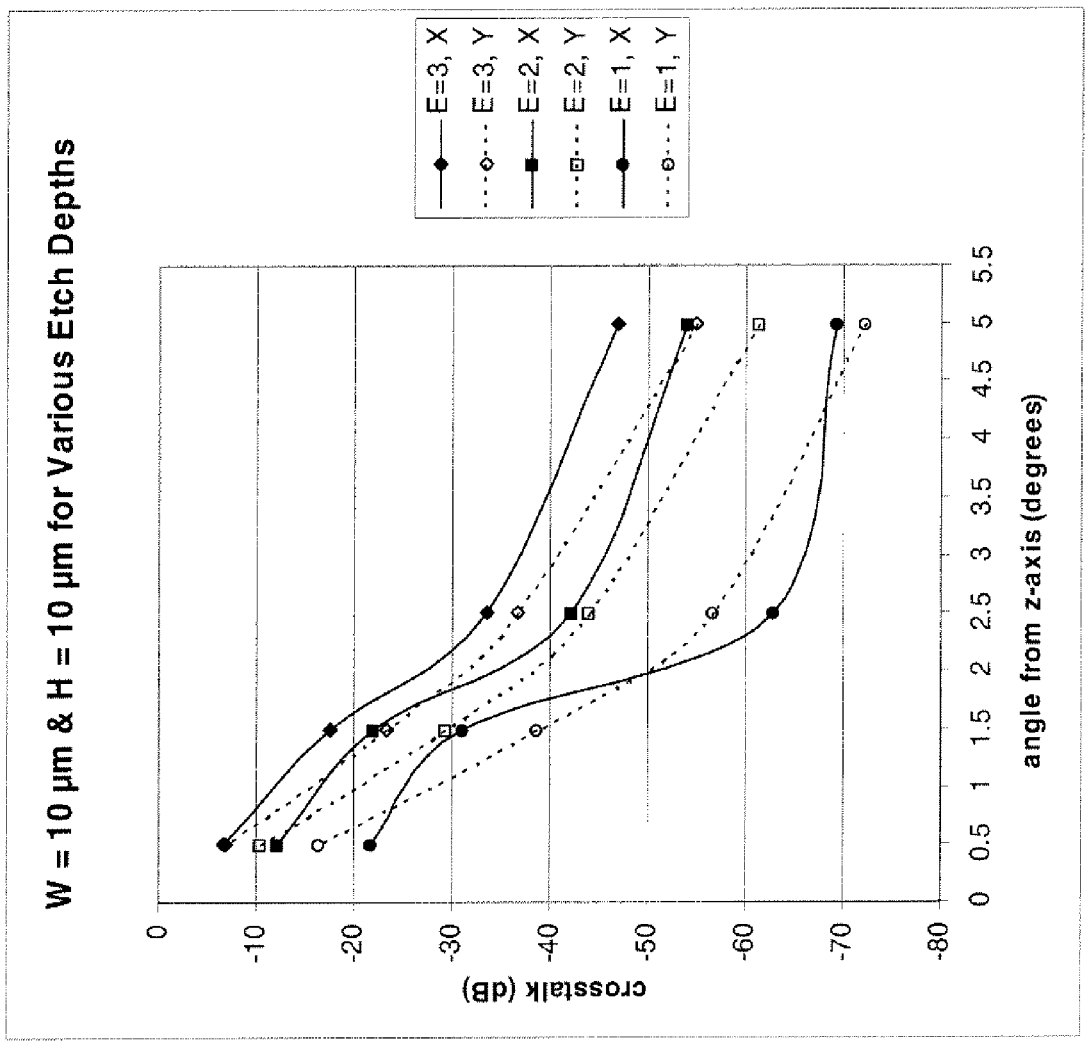
Figure 14A:
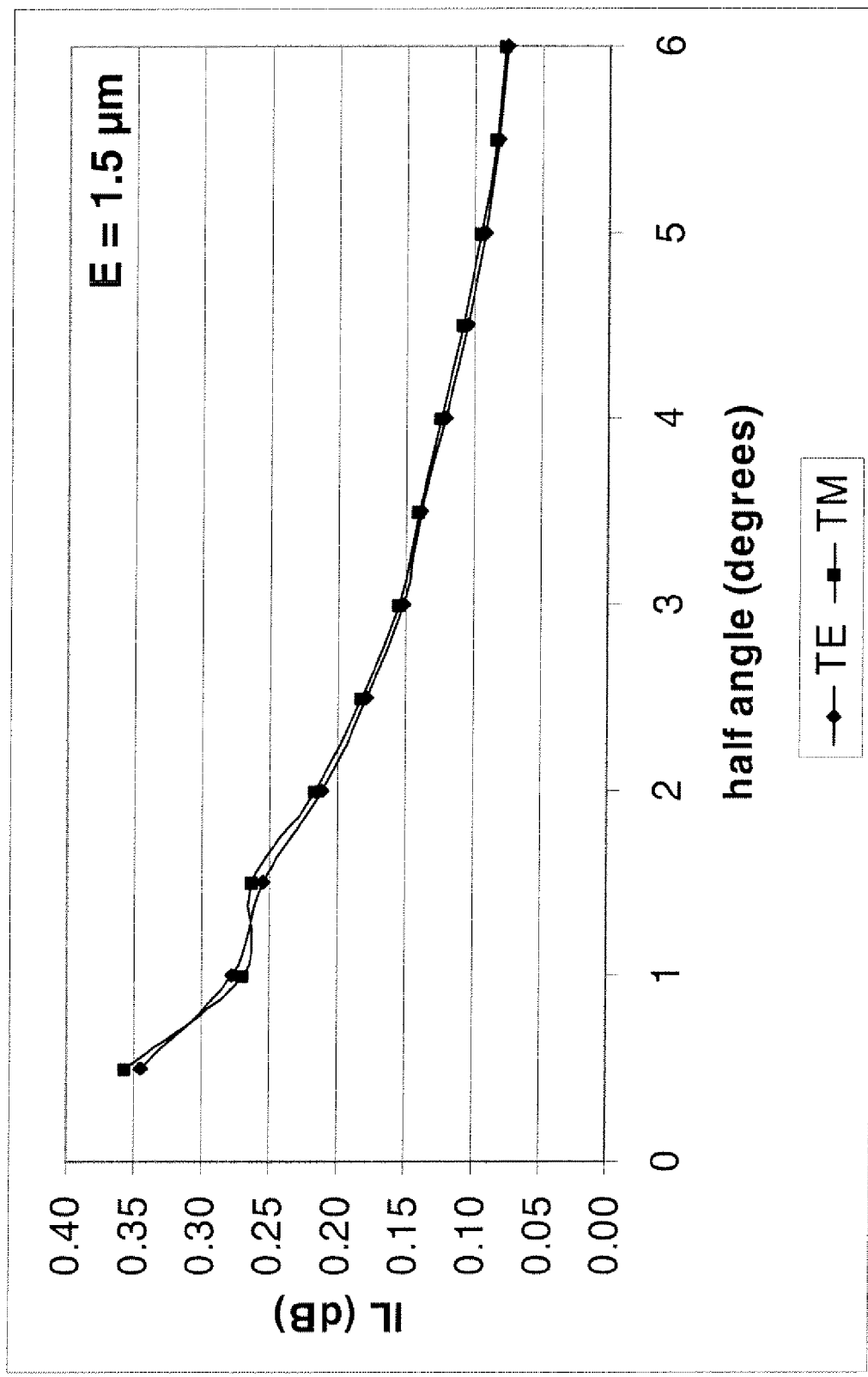
FIGS. 14A and 14B are diagrams illustrating the numerical predictions for a ridge waveguide according to one embodiment.
Figure 14B:
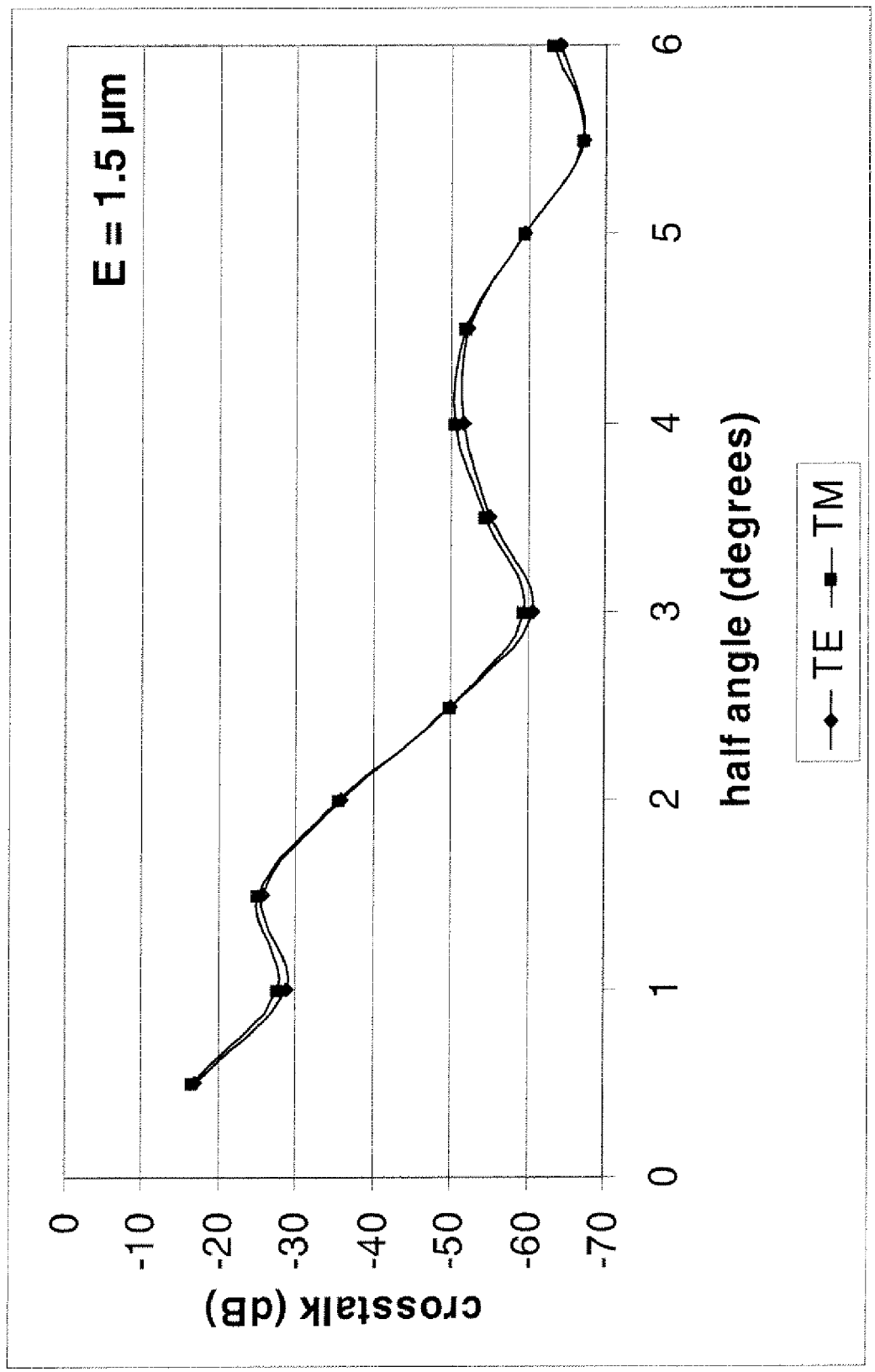

According to one embodiment, asymmetric y-branches in addition to waveguide crossings may be utilized, as shown in FIG. 12. The numerical simulation results are shown in FIGS. 13A and 13B for the IL and crosstalk. As shown in FIGS. 13A and 13B, the IL of the asymmetric y-branches is lower than the IL for a waveguide crossing. The crosstalk for a waveguide crossing also shows an oscillatory behavior that is not present for the asymmetric y-branch. FIGS. 14A and 14B are diagrams illustrating the numerical predictions for the single case of a ridge waveguide with an etch depth of approximately 1.5 μm. These results were produced with a much higher numerical accuracy (closer to convergence), so slight discrepancies are to be noted when compared to the less accurate and scalar results shown in FIGS. 13A and 13B.

Switching in Relatively Large SOI Ridge Waveguides

Figure 15:
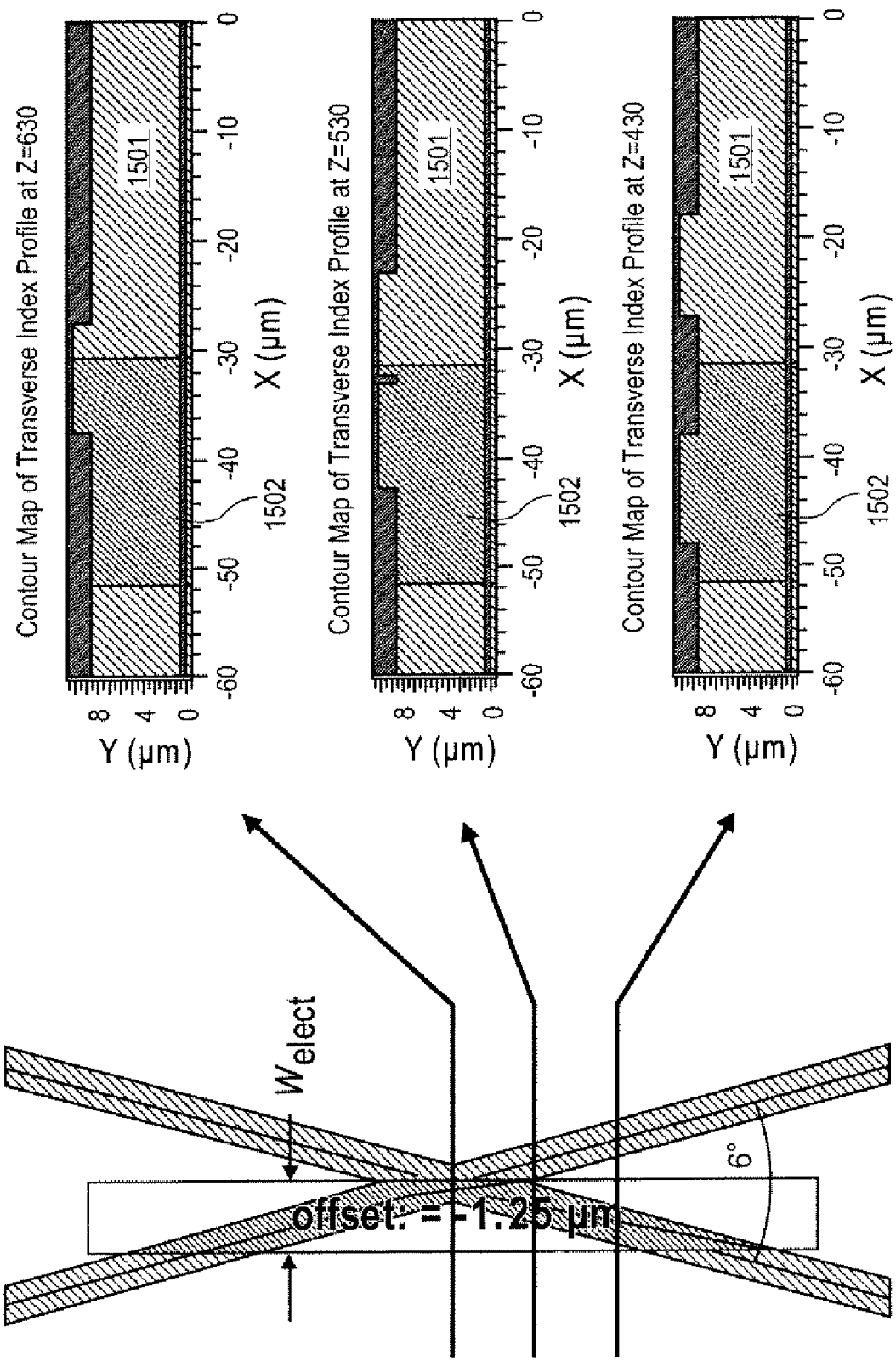
FIG. 15 is a block diagram illustrating a physical model for the 2×2 TIR X-switch according to one embodiment of the invention.

FIG. 15 is a diagram giving the top view of the ridge-waveguide layout with three cross-sectional views to further illustrate a physical model for the 2×2 TIR X-switch according to one embodiment of the invention. In one embodiment, the BPM is used to simulate the performance numerically. The model establishes a baseline for the performance of carrier-induced TIR X-switches in silicon following the use of a large ridge waveguide.

Referring to FIG. 15, regions (majority of the device) 1501 represent silicon. The regions 1502 corresponding to the location of the drive electrode have an index of refraction modified by carrier-injection, which is determined by the formulas described above for the real and absorptive parts of the refractive index, respectively. Note that the length of the electrode is approximately 1000 μm, and may change in value depending upon the crossing angle and amount of mode confinement (e.g., mode-profile width).

Figure 16:
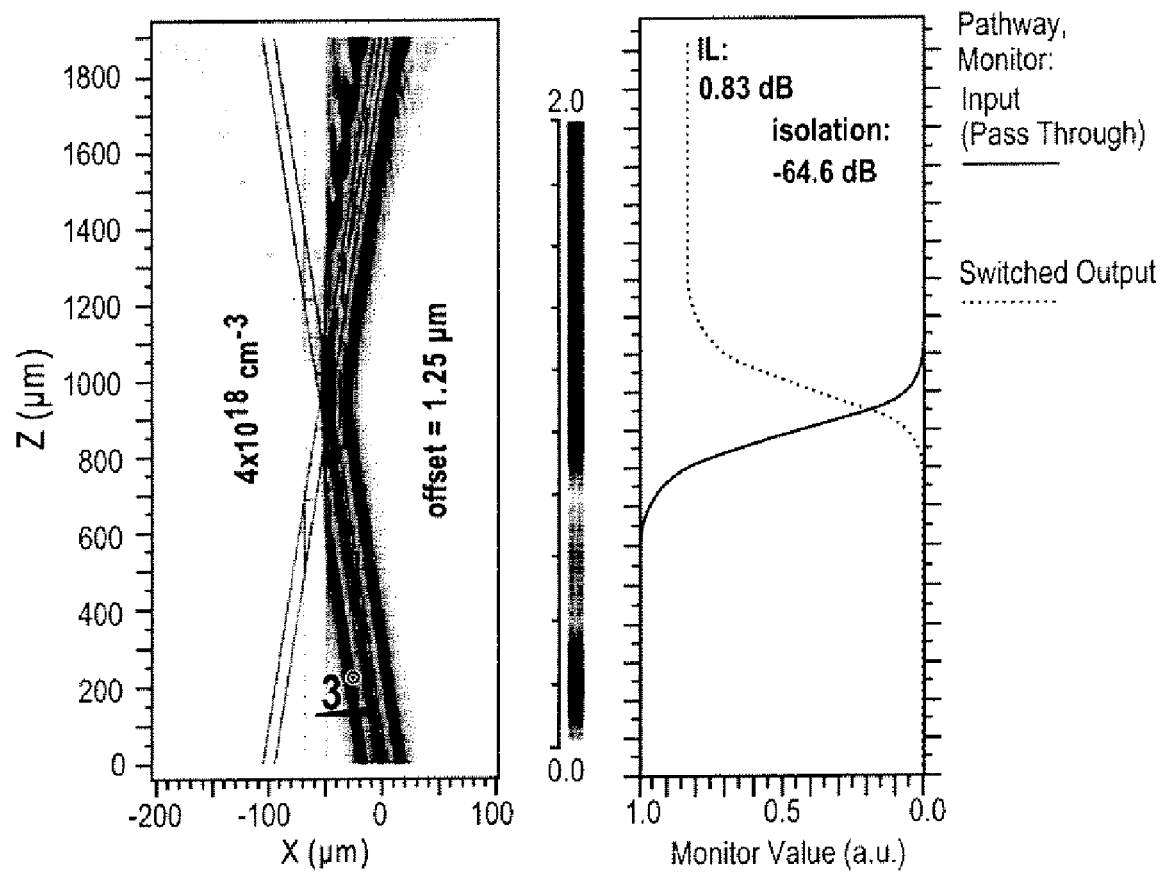
FIG. 16 is a diagram illustrating exemplary results of a BPM simulation of propagation according to one embodiment.
Figure 17A:
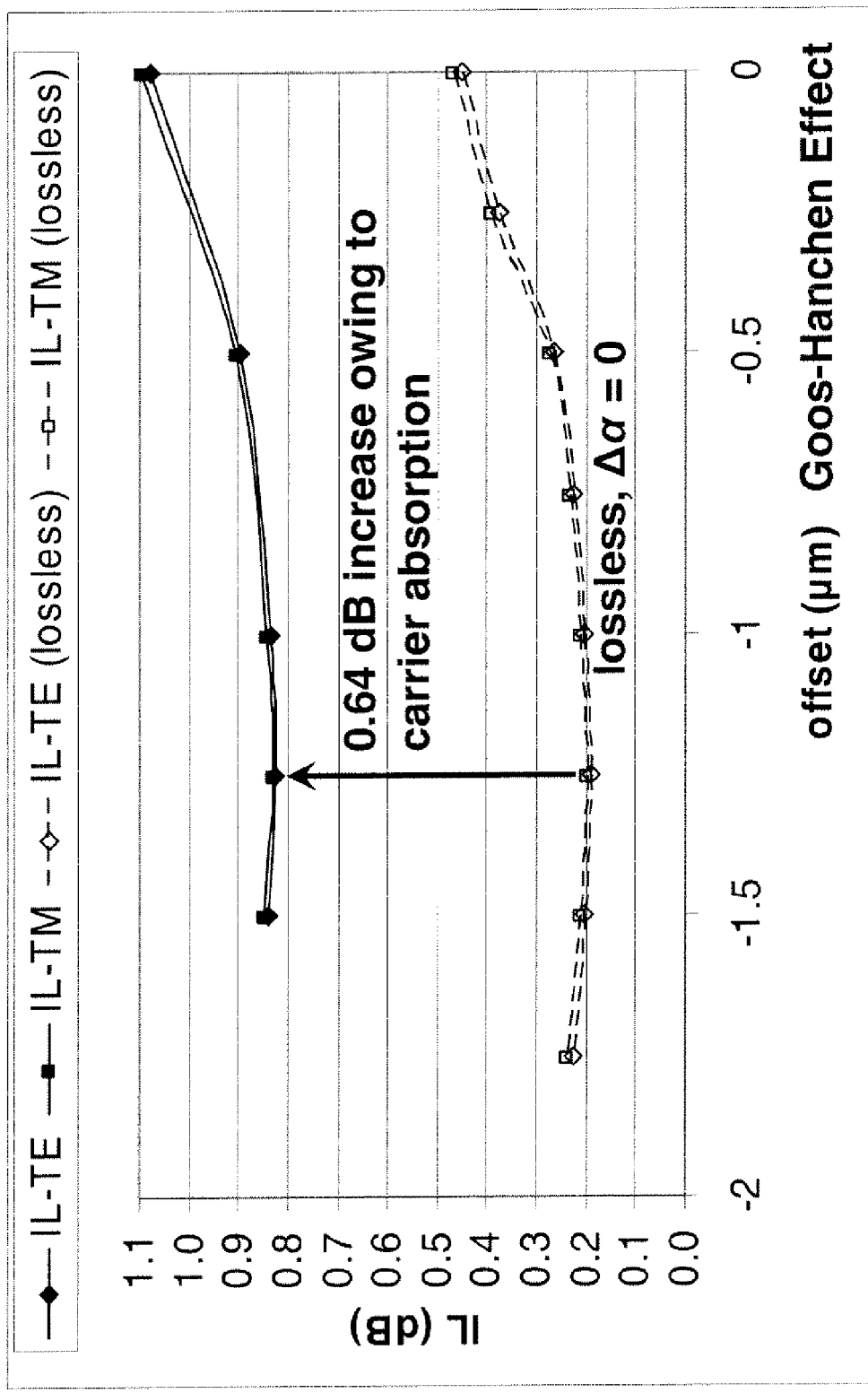
FIG. 17A is a diagram illustrating light loss due to a variety of factors.
Figure 17B:
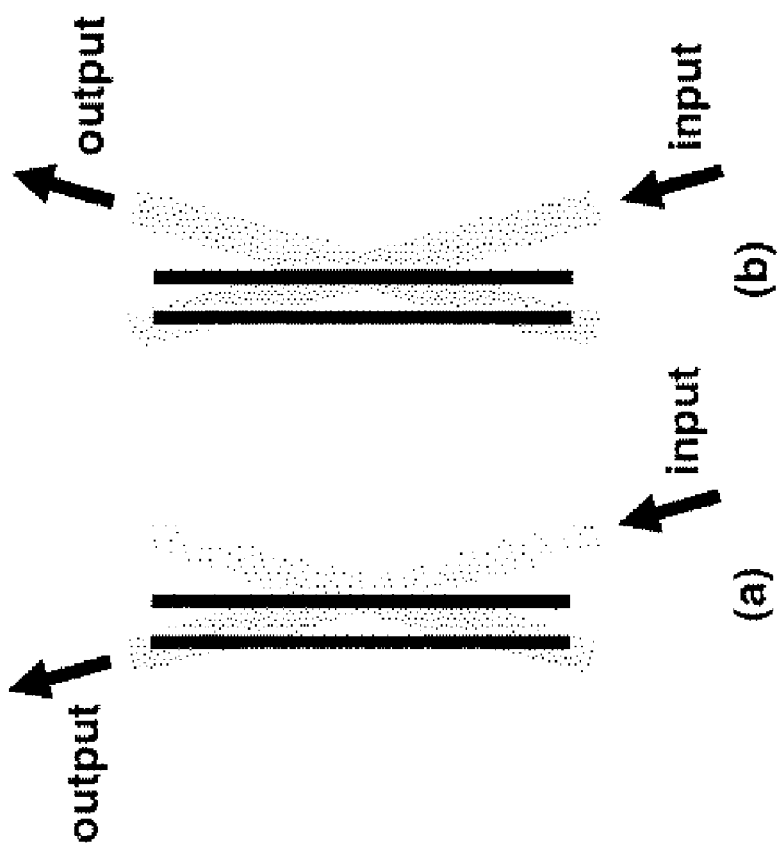
FIG. 17B is a diagram illustrating an exemplary optical switch according to one embodiment.
Figure 18A:
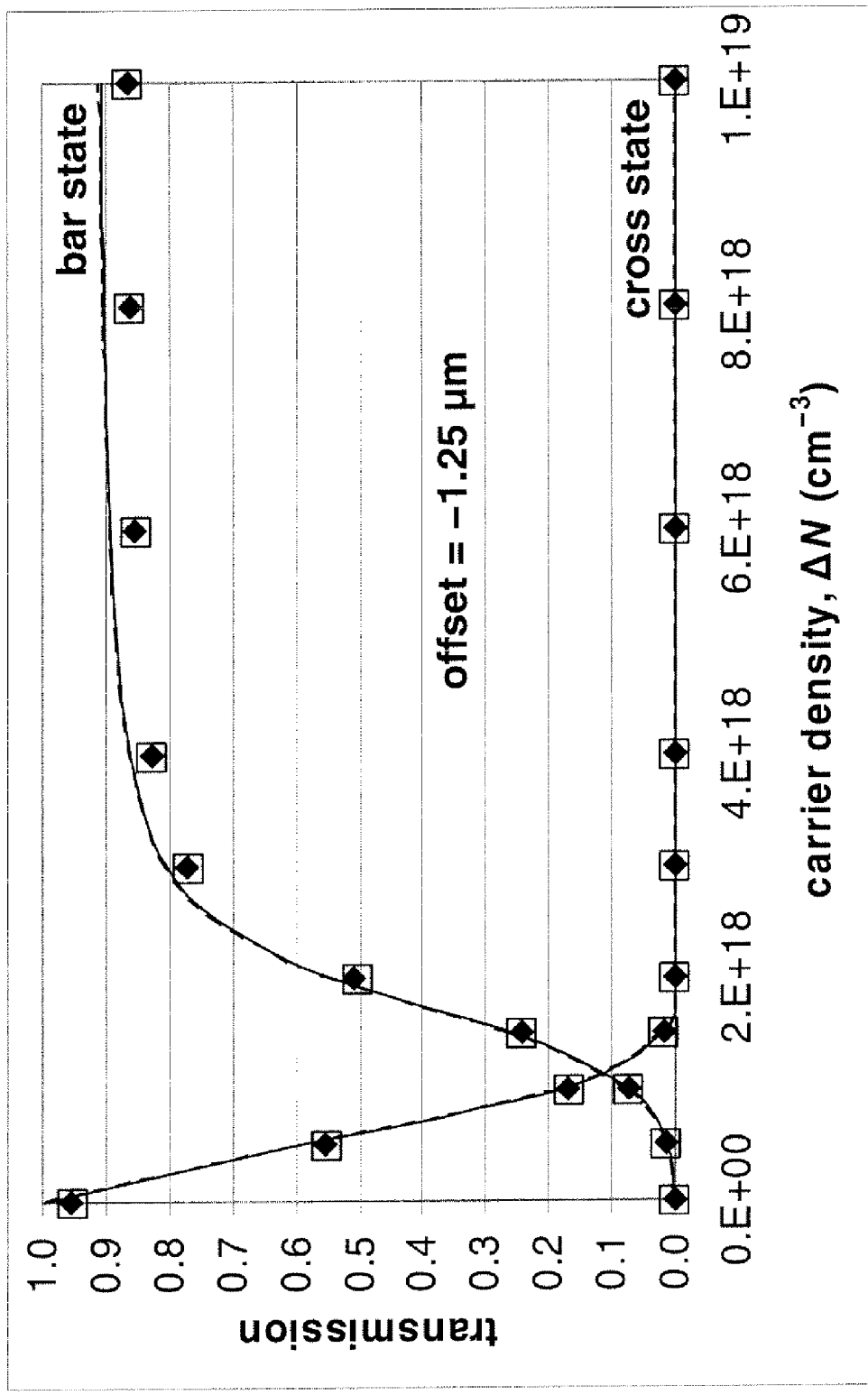
FIG. 18A is diagram illustrating an exemplary performance of an optical switch according to one embodiment.

FIG. 16 is a diagram illustrating exemplary results of a BPM simulation of propagation through the activated switch (e.g., carrier density $N=4\times10^{18}$ cm$^{-3}$). The IL is approximately 0.83 dB, where approximately 0.64 dB of the IL is due to the presence of carrier-induced absorption as detailed by the plots as shown in FIG. 17A. FIG. 17A also shows the presence of the Goos-Hanchen effect, which influences the optimal lateral offset of the electrode. It is anticipated that the actual gradients may influence the optimal lateral offset far greater than the Goos-Hanchen effect. Both offset effects may continue to be present. The gradients may most likely require the electrode to be displaced to the left of the center of the waveguide-crossing vertex shown in FIG. 15 to such an extent that the overall offset becomes positive in value. FIG. 17B is diagram illustrating the possible operating states of an optical switch according to one embodiment. FIG. 18A is diagram illustrating an exemplary performance of an optical switch having a model similar to the one shown in FIG. 15. Referring to FIG. 18A, transmission (linear scale) normalized to the input intensity of the bar (diverted path) and cross (straight-through path) states of the 2×2 TIR X-switch as a function of the carrier density (bias voltage). The results are from the use of both 2D and 3D BPM modeling. TE and TM results are both included.

Figure 18B:
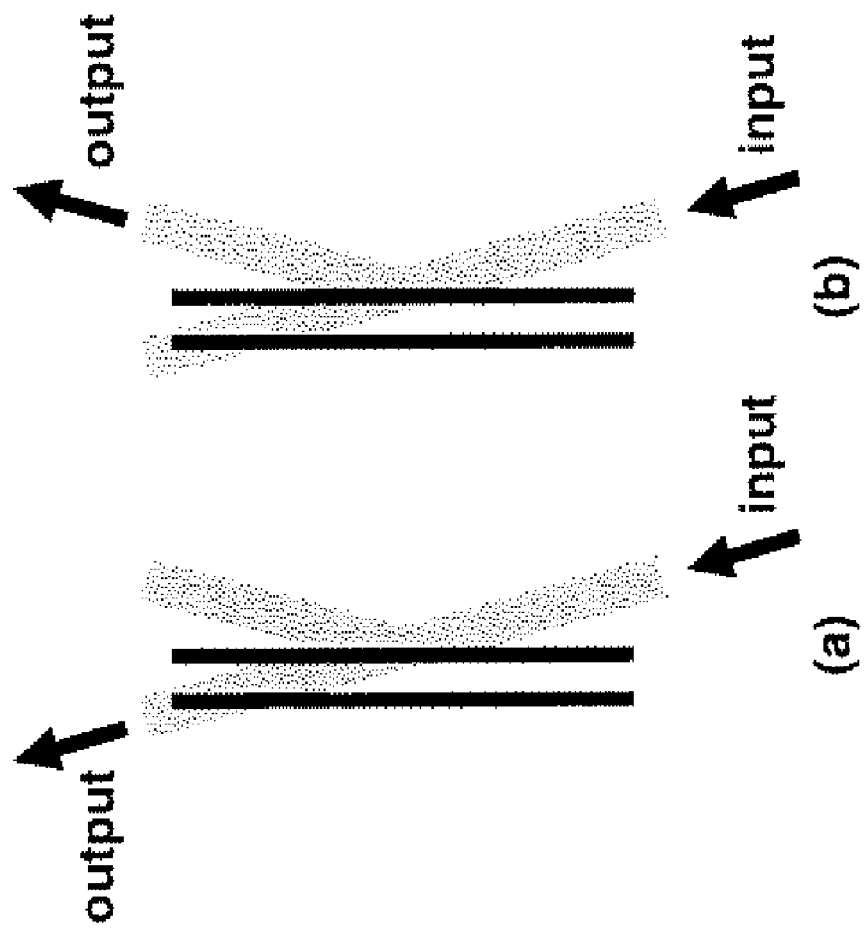
FIG. 18B is a diagram illustrating an exemplary optical switch according to one embodiment.

The performance of the TIR Y-Switch depicted in FIG. 18B is anticipated to be similar to that given in FIG. 18A when regarding the performance of the straight-through and diverted pathways of the switch. Historically, the naming conventions for the cross and bar states are swapped for the TIR Y-Switch with respect to those for the TIR X-Switch.

Exemplar Electrode Designs

Figure 19:
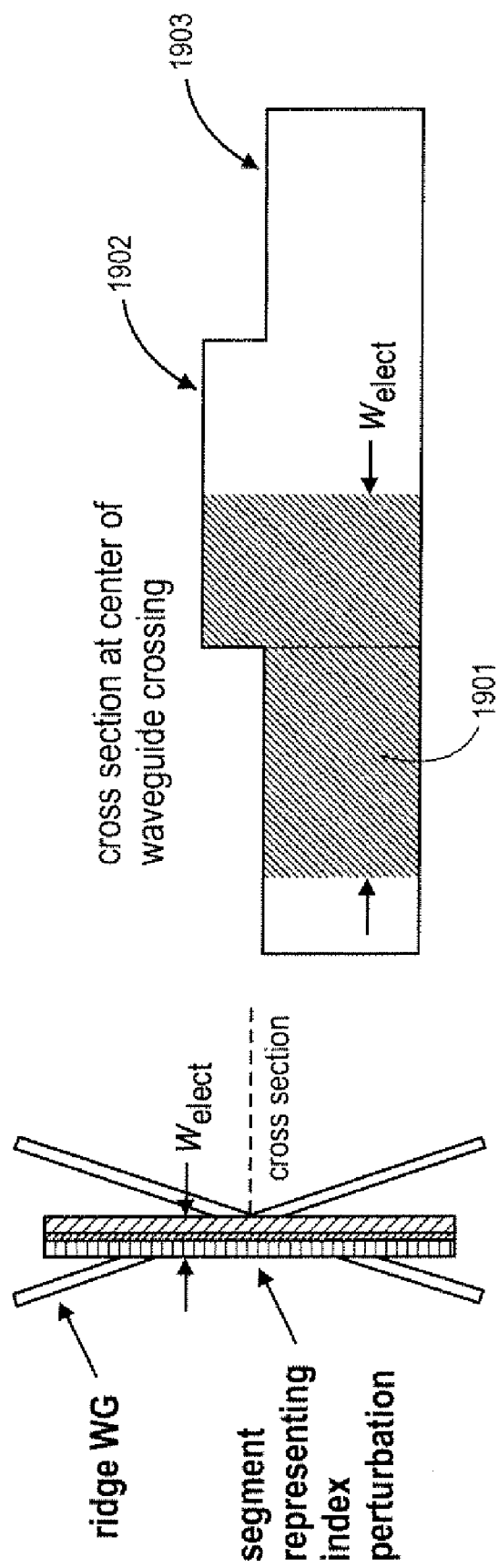
FIG. 19 is a diagram illustrating an exemplary electrode configurations used in an optical switch according to one embodiment of the invention.

According to one embodiment, relatively long electrodes are used to drive the carrier-induced index changes, which creates a high-reflection phenomena. FIG. 19 is a diagram illustrating an exemplary electrode configurations used in an optical switch according to one embodiment of the invention. Referring to FIG. 19, a large-electrode embodiment includes the essential doping (n$^+$ and p$^+$) and metallization that enables the fabrication and operation of the TIR X-Switch. The electrode function to drive the bar state of operation, but when powered down are also compatible with the specification of low optical loss for the passive waveguide crossing (e.g., the cross state of operation). The TIR effect produces optimal switching when the TIR effect is longitudinally invariant, which means the TIR mirror is flat. The hatched region 1901 in FIG. 19 represents the region of desired carrier-induced refractive-index change, which is meant to correspond in width to that depicted in FIG. 15. It is denoted this width as $W_{elect}$. In one embodiment, the carrier injection process leads to gradients of the refractive index owing to carrier diffusion. Coplanar electrode geometry mitigates the effects of diffusion by sharpening the discontinuity (TIR-mirror formation) in the refractive index. Thus, the width $W_{elect}$ used in the BPM modeling with sharp gradients as depicted in FIG. 15 may be regarded as the effective width owing to the presence of gradients, not the physical width of the coplanar electrodes.

Figure 20:
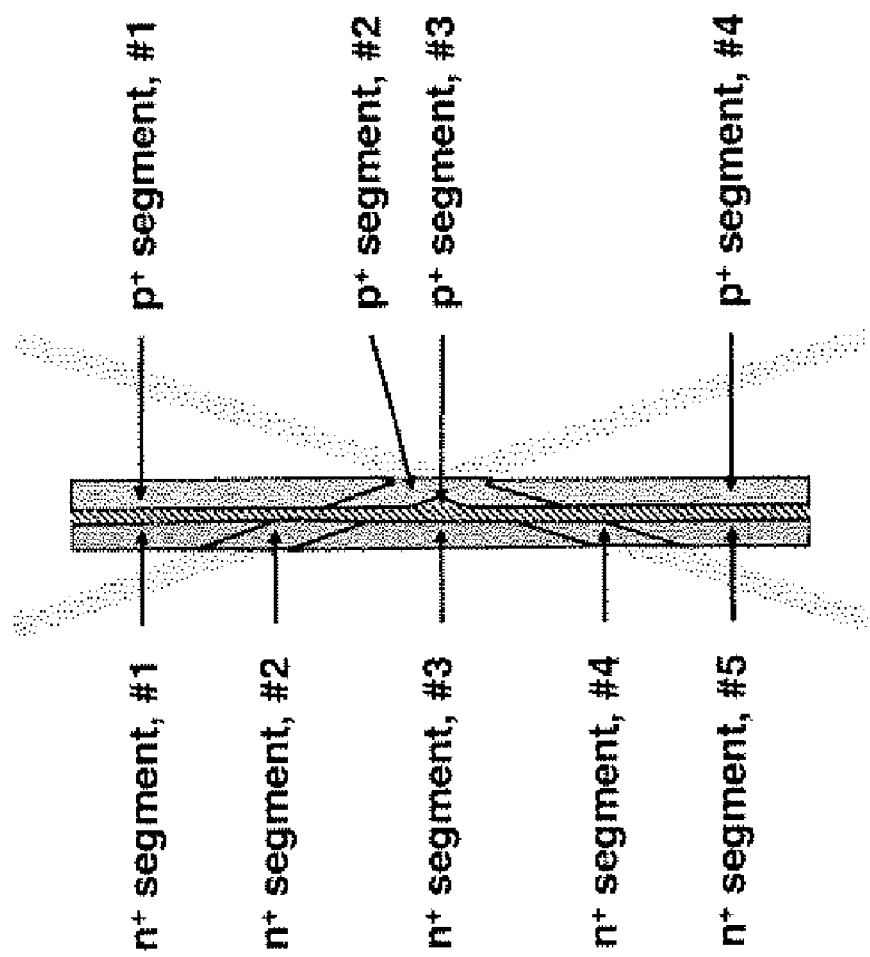
FIG. 20 is a diagram illustrating an exemplary optical switch according to one embodiment.

According to one embodiment, there are two locations for the electrode, either on top of the ridge 1902 (i.e., the zone not etched) or on top of the slab 1903 (e.g., etched zone) of the waveguide. Since each electrode of the pair crosses over the two ridge waveguide forming the waveguide crossing, each of the electrodes can be consider to be divided into five or fewer segments, similar to an embodiment as shown in FIG. 20. There are at most two distinct segments on top of the ridge and three distinct segments located on the slab. A particular case is depicted in FIG. 20, where the n$^+$ electrode is composed of five segments and the p$^+$ electrode is composed of four segments. In order to achieve a flat TIR mirror, the drive signal to each of these segments may need to be tailored. In one embodiment, this may be achieved by using a voltage divider circuit to divide the drive signal over the electrodes in some prescribed manner or individual electrical traces may deliver unique drive signals to the five electrode segments.

Figure 21A:
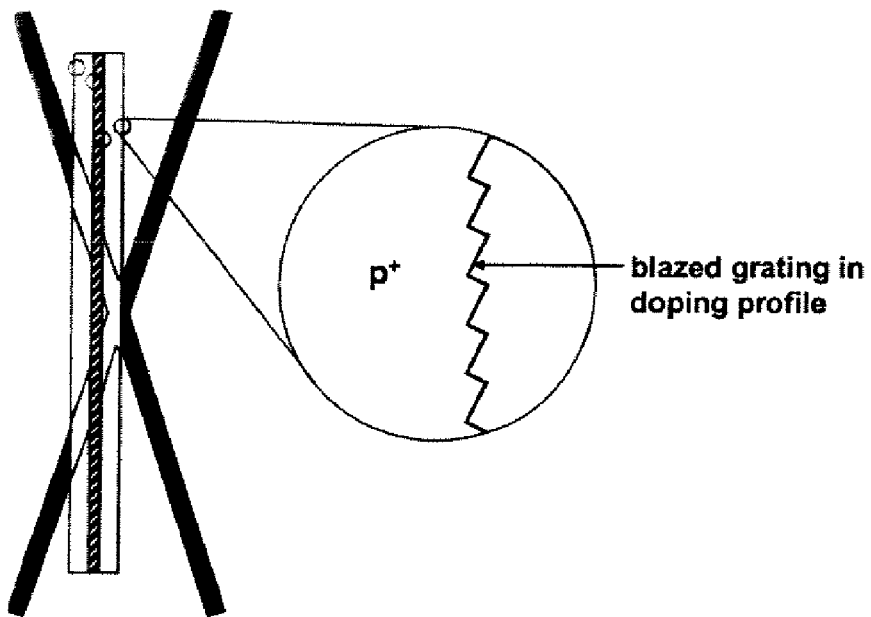
FIGS. 21A and 21B are diagrams illustrating an exemplary optical switch according to another embodiment.
Figure 21B:
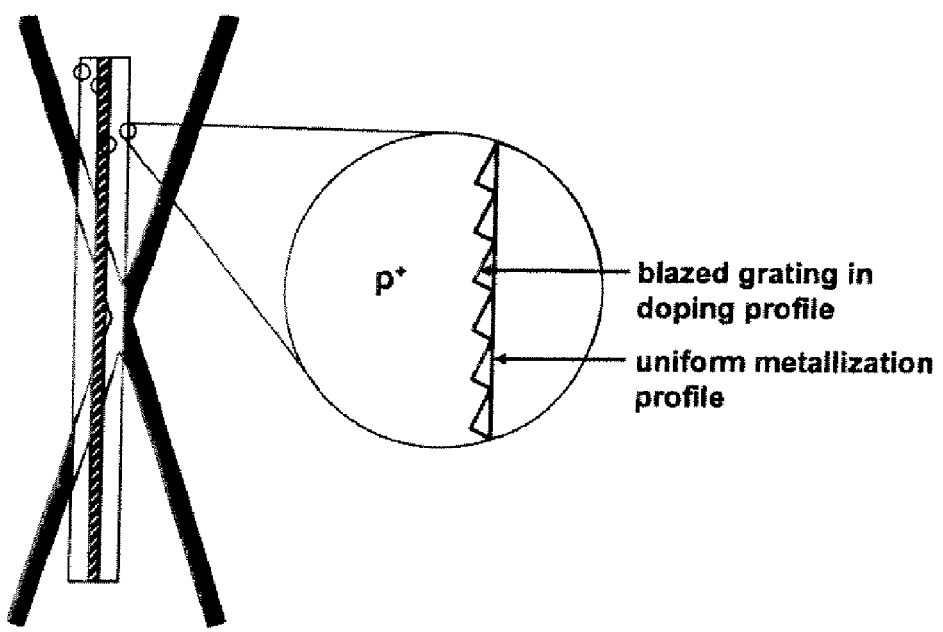
Figure 21C:
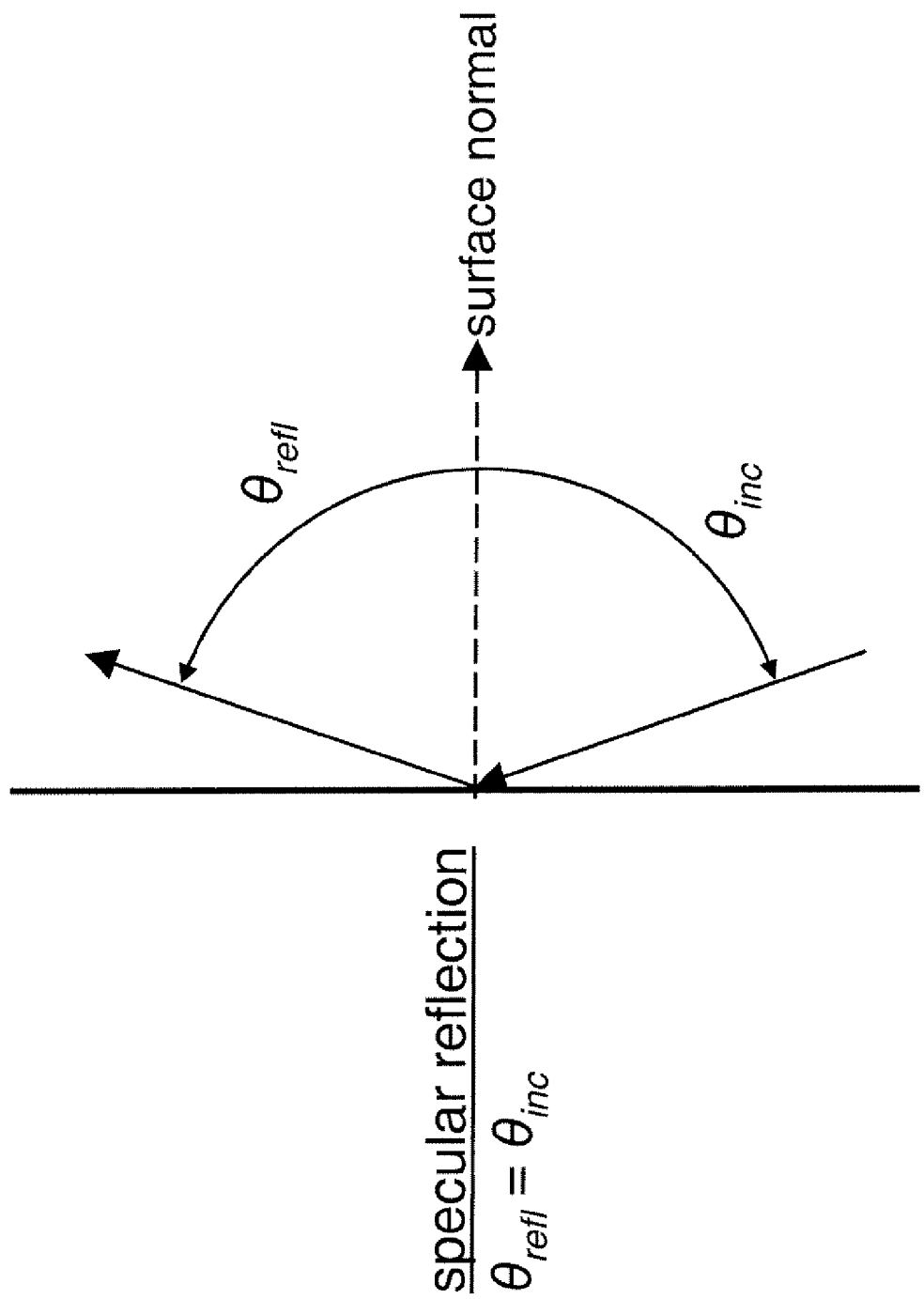
FIGS. 21C-21I are diagrams illustrating various configurations of optical switches according to certain embodiments.

Shown in FIGS. 21A and 21B are diagrams of certain embodiments of optical switches having of grating-edge profiles in the doping and metallization and in the doping only, respectively. These edge profiles are on both edges of a given electrode of the actual coplanar pair of electrodes. The use of the gratings is to solve a potential problem of too much crosstalk (scattered light) in the bar output when the switch is powered down and operating in the cross state. The origin of the increased signal in the bar output would be reflection off of a weak, but flat, index perturbation owing to the doping profile or induced strain in the material, as shown in FIG. 21C. The index difference would allow for a reflection to occur that directs the input light to the bar output, which is not desired for proper function of the TIR X-Switch.

Furthermore, this unwanted weak reflection would direct light to the bar output similar to the "attenuated" TIR mirror that is established by the presence of charge carriers owing to an applied bias voltage. The grating structure (e.g., non-uniform surfaces or edges) is blazed so that specular reflection off of the grating would direct the input light, not to the bar output, but to a much different angle. The light would then diffract away within the stab waveguide. The crosstalk would then be reduced greatly, if present at all. The depth of the grating notches is to be much less than the carrier diffusion length (approximately 10 µm), but equal to or longer than the wavelength of light (e.g., approximately 1.55 µm).

When the electrode is activated via application of a bias voltage, the blurring that occurs from carrier diffusion may effectively remove the influence of the grating and the desired TIR switching may occur. The embodiments may use grating-edge profiles in the doping and metallization profiles (e.g., FIG. 21A) or in the doping profile only (e.g., FIG. 21B), where a uniform metallization edge-profile would be used in this second case.

Referring to FIG. 21A, the edge of electrode segment showing the possible use of a blazed grating in the doping and metallization profiles. These profiles would be occurring also for the opposite edge of the electrode segment. Referring to FIG. 21, the edge of electrode segment showing the possible use of a blazed grating in the doping profile and a uniform metallization profile. These profiles would be occurring also for the opposite edge of the electrode segment.

Some of the attributes of the electrode design may include one or more of the following:

Electrode for longitudinal invariant carrier injection to create a flat TIR mirror;

Minimum electrode dimensions for reduced drive power;

Silicon doping and metallization consistent with low-loss optical propagation of a powered down (passive) waveguide crossing;

Ridge waveguide geometries that best enable the TIR switching while maintaining a low-optical-loss waveguide crossing when powered down; and Mitigate by electrode and waveguide design the impact of index gradients and carrier absorption on the reflected light owing to an imperfect carrier-induced TIR mirror.

Figure 21D:
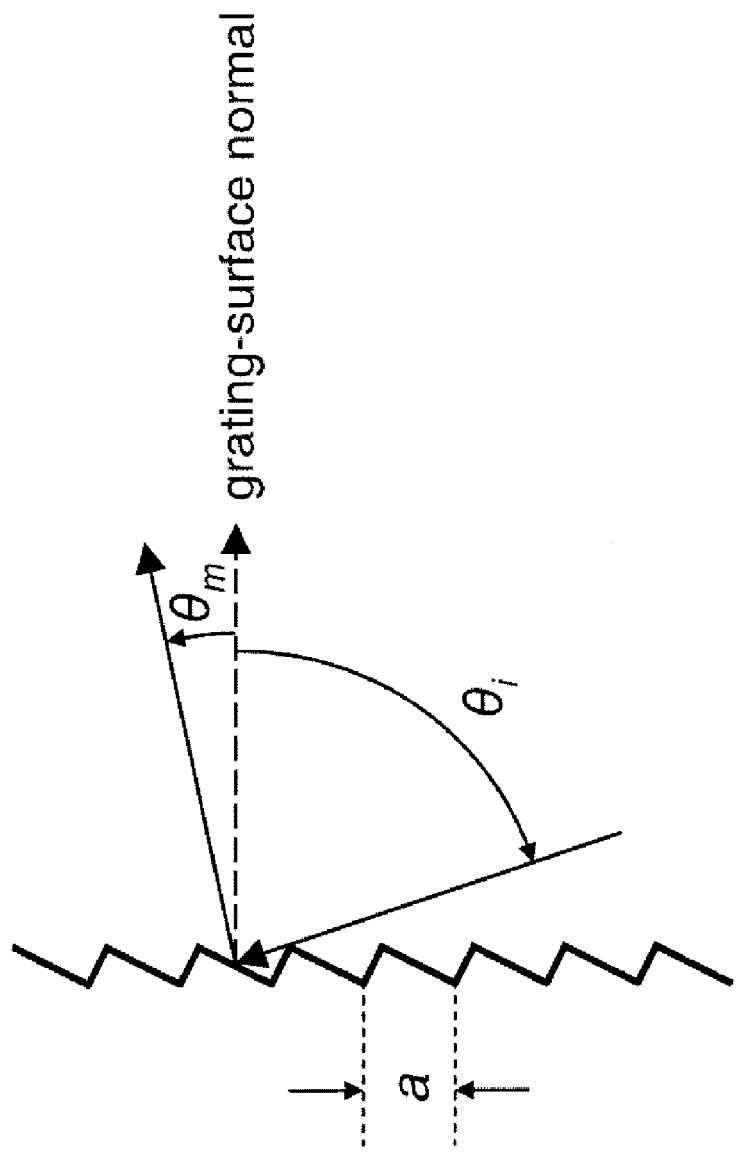
Figure 21E:
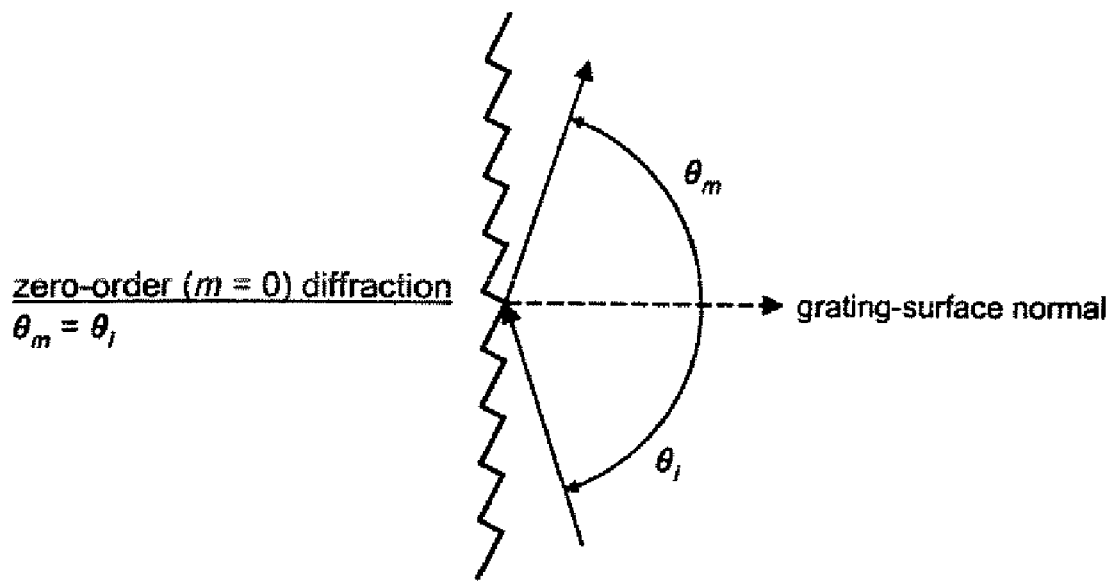

In view of the properties of a reflection orating employed in designing the electrodes with the grating feature, according to one embodiment, the angle of diffraction $\theta_m$ is related to the angle of incidence $\theta_i$ by the following formula $$a(\sin\theta_m + \sin\theta_i) = m\lambda \qquad (3)$$

where a is the grating period, $\lambda$ is the wavelength of light, m=0, ±1, ±2, ±3, ... is the diffraction order. Shown in FIG. 21D is also the definition of the grating-surface normal, which the angles are measured.

The case of m=0 corresponds to the case known as zeroth-order diffraction when the angle of diffraction $\theta_m$, is equal to the angle of incidence $\theta_i$. Zeroth-order diffraction (depicted in FIG. 21E) is independent of the wavelength $\lambda$ and grating period a. Note that this case is similar to specular reflection as depicted in FIG. 21C in terms of the angular relationship.

Figure 21F:
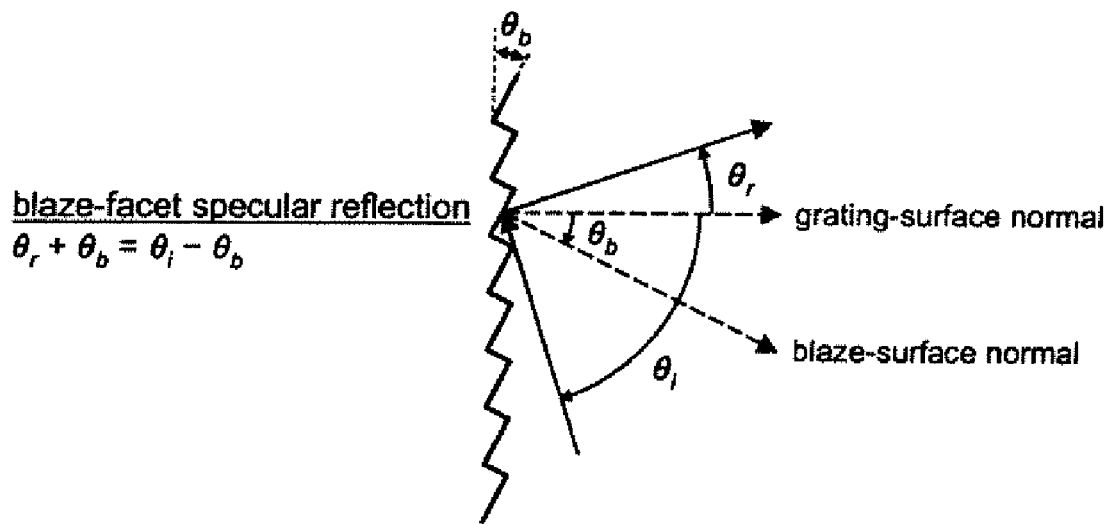

According to one embodiment, the diffraction grating can be constructed such that the periodic structure has facets at an angle $\theta_b$, which is known as the blaze angle as depicted in FIG. 21F. This blazing of the diffraction grating improves the efficiency of higher-order diffraction (m≠0) and decreases the power diffracted in the zeroth order. As a result, a reflected or diffracted waves may be reduced since it would contribute to the crosstalk of the bar state.

In order to assess what conditions lead to enhanced diffraction efficiency owing to blazing, we first examine the angles of incidence and reflection for the facets. Specular reflection off of the flat facets with angular orientation $\theta_b$ occurs for angles of incidence $\theta_i$ and angles of reflection $\theta_r$, given by the relation $\theta_r + \theta_b = \theta_i - \theta_b$ when measured with respect to the grating-surface normal.

When the angle of diffraction $\theta_m$ matches this angle of facet specular refection $\theta_r$, then the diffraction occurs with improved efficiency. The actual efficiency of diffraction cannot be assessed with the current approach. However, we can still find the detailed relation among the parameters of wavelength $\lambda$, grating-period a, diffraction-order in, and incidence-angle $\theta_i$. The requirement of simultaneous diffraction and facet specular reflection in the similar angular direction gives $$\theta_m = \theta_r = \theta_i - 2\theta_b, \qquad (4)$$

where the incidence-angle $\theta_i$ satisfies the implicit the following equation $$2a\cos(\theta_i - \theta_b)\sin\theta_b = m\lambda. \qquad (5)$$

Figure 21G:
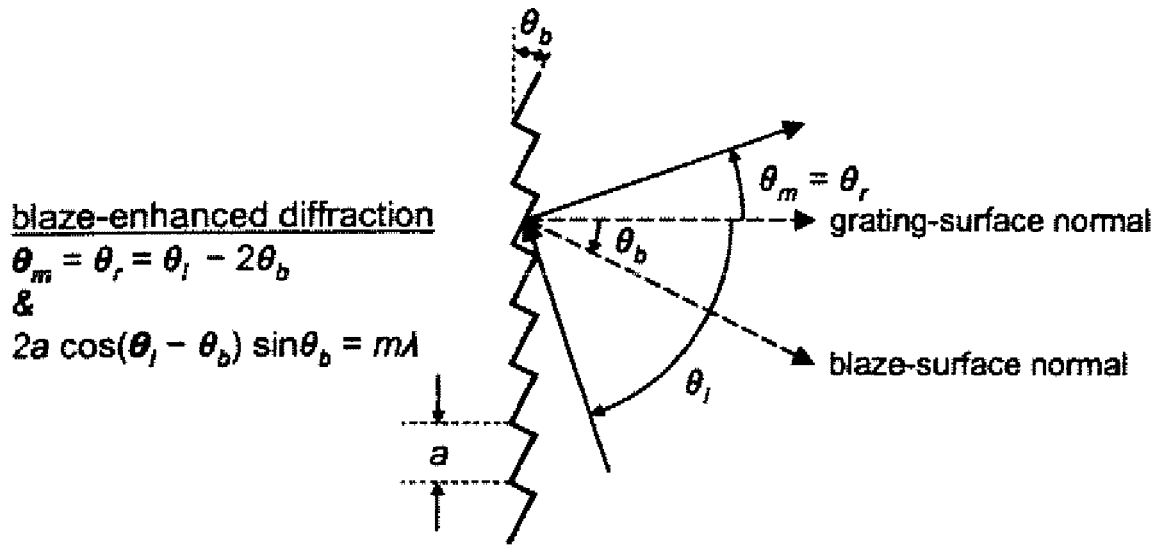

These relations give specific conditions for blazed diffraction once some of the parameters are fixed. In this case, when the wavelength $\lambda$ is a communications-channel wavelength, it is useful to consider it as a fixed parameter. It can vary, though, with the selection of communications channel. In one embodiment, it is assumed the wavelength $\lambda$ to be within the C-band, where it is customary to use the value of 1.55 µm as an approximate value for such an analysis. It will be useful to design the grating for use with a particular diffraction-order m, but more than one choice is possible and appropriate. In a particular embodiment, it is considered m=1, 2, and 3. The design parameters requiring determination of proper values are the grating-period a and blaze-angle $\theta_b$. These two parameters need to correspond to a grating structure that can be fabricated as shown in FIG. 21G, according to one embodiment.

Figure 21H:
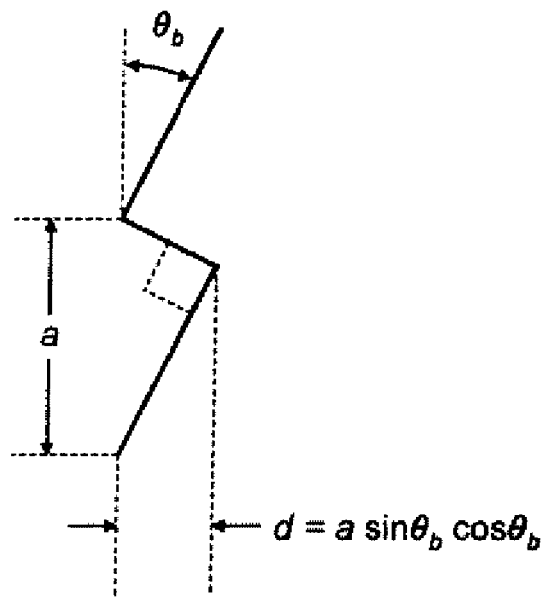
Figure 21I:
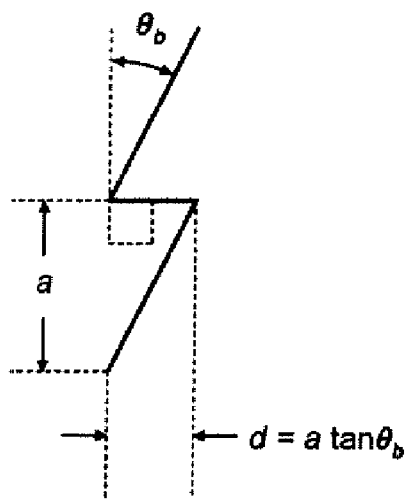

There are two grating structures that we shall consider in detail, which are depicted in FIGS. 21H and 21I. Note that these configurations are illustrated by way of examples, not by way of limitations. The case in FIG. 21H is a typical case where the grating depth is $$d = a\sin\theta_b\cos\theta_b; \qquad 6)$$

whereas the case in FIG. 21I corresponds to the maximum grating-depth $$d = a\tan\theta_b \qquad (7)$$

That is possible without having grating facets that overlap like cresting ocean waves. We can solve Eqs. (5) to give us the general relation for the grating-period a, which is $$a = m\lambda/[2\cos(\theta_i - \theta_b)\sin\theta_b] \qquad (8)$$

and further use Eq. (7) with Eq. (8) to give a relation between the largest grating depth and the blaze angle, which is $$d = m\lambda/[2\cos(\theta_i - \theta_b)\cos\theta_b] \qquad (9)$$

There is a grating-depth d owing to its relation to the characteristic carrier-diffusion distance, which it is identified to be approximately 10 µm. Thus, Eq. (9) can be used to find proper values of the blaze-angle $\theta_b$ for target values of the incidence-angle $\theta_i$, where the wavelength $\lambda$ is approximately 1.55 μm. The diffraction order m is a free parameter that provides for the selection of the diffracted wave $\theta_m$ with blaze-enhanced diffraction efficiency. The corresponding grating-period a is then found using Eq. (8). Equation (7) is also valid for relation the grating-period a to the grating-depth d and blaze-angle $\theta_b$.

According to one embodiment, one of the purposes of using the blazed grating is to move light that would have been specularly reflected at an angle $\theta_{refl}$ when incident on a uniform surface at an angle $\theta_{inc}$, to a diffracted order with blaze-enhanced diffraction efficiency. The net angular displacement is $\theta_d = \theta_i - \theta_m$, where $\theta_i$ corresponds to $\theta_{inc}$, and $\theta_{inc} = \theta_{refl}$. The appropriate selection of a displacement-angle $\theta_d$ reduces the amount of unwanted light from coupling to the bar-state when the light is supposed to be directed solely to the cross state.

Figure 23:
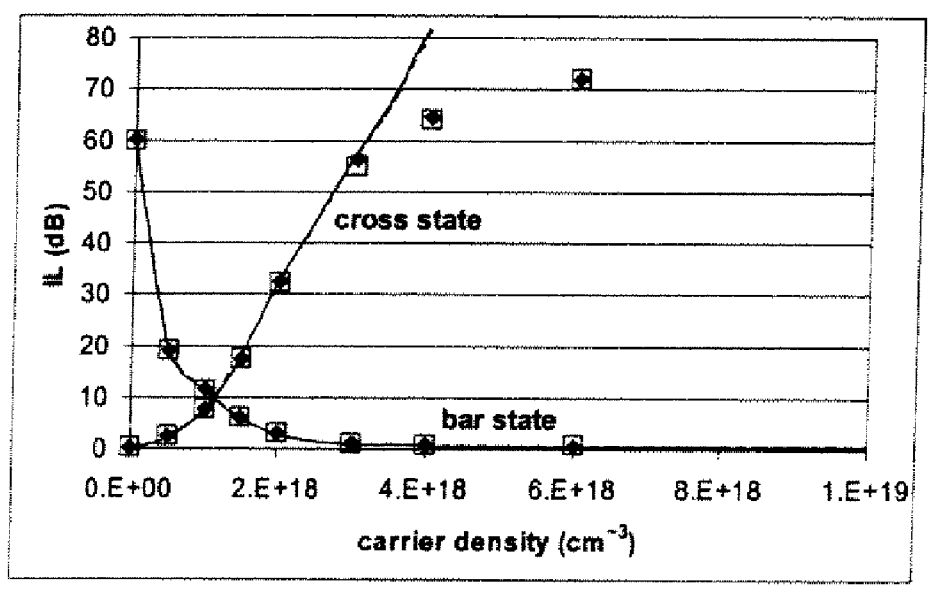
FIGS. 23, 24A, and 24B are plots illustrating performance of optical switches according to certain embodiments.

Following table illustrates various embodiments of grating-period a and blaze-angle $\theta_b$ with the resulting displacement-angle $\theta_d = \theta_i - \theta_m$ for the selected diffraction order m optimized under the assumption of a preferred grating-depth d=10 μm and an operating wavelength λ=1.55 μm. The use of the "-" is to indicate for that mode number m there is no good value that may be utilized. Marked in bold font is believed to be a preferred selection of parameter values. Note that the influence of blazed-grating electrodes have not been included in the performance assessment in other sections.

state of the TIR Y-Switch) may be higher than the attenuation of the bar state for the TIR X-Switch (cross-state of the TIR Y-Switch). Referring to FIG. 23, the results of FIG. 18A replotted on a dB vertical scale (i.e., IL). The cross state reaches higher values of IL (attenuation) than the bar state for the TIR X-Switch, and similar may occur for the TIR Y-Switch (swap the labeling of the cross and bar states). The results are from the use of both 2D and 3D BPM modeling. TE and TM results are both included.

Figure 24A:
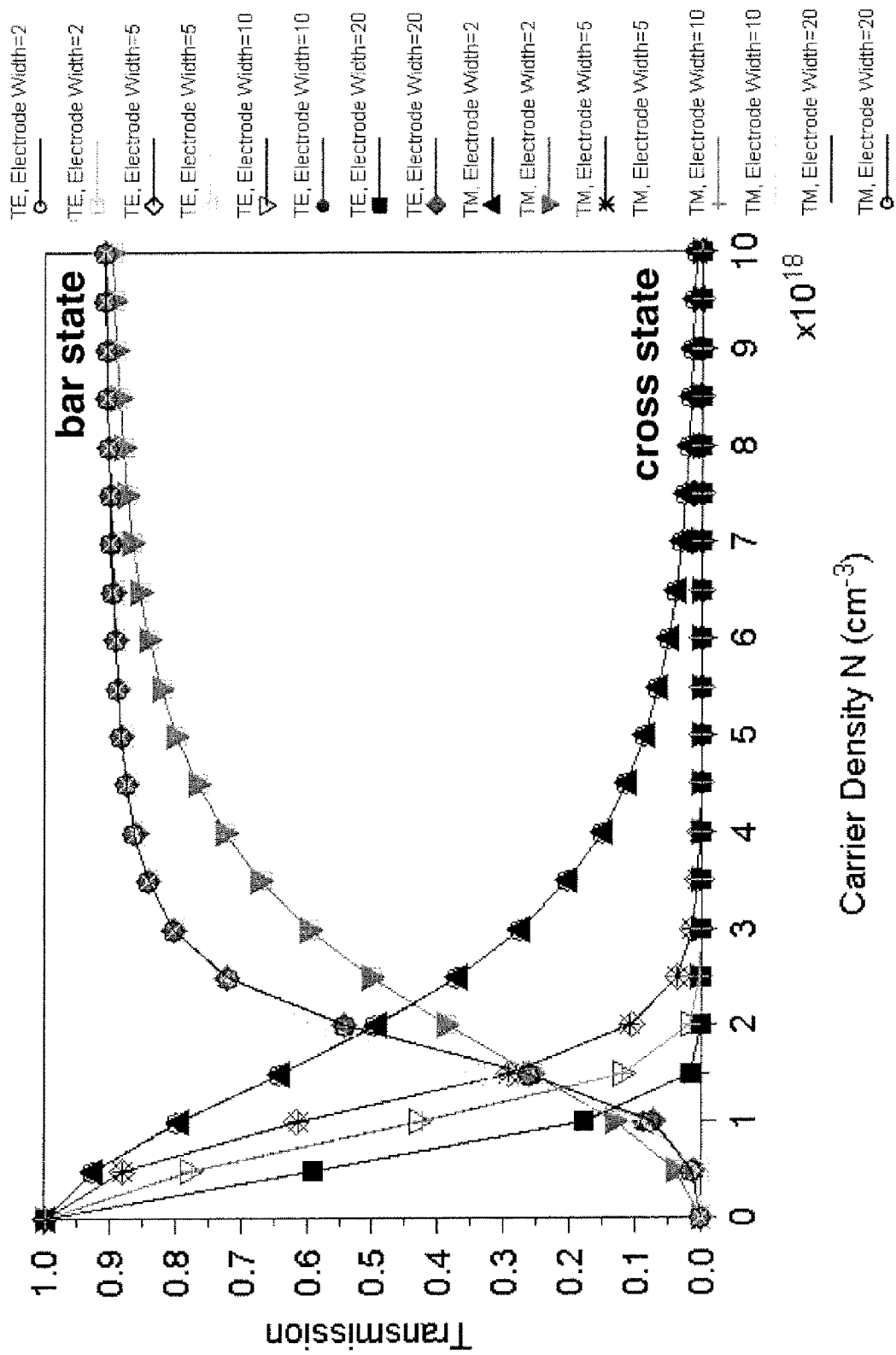

The critical parameter determining this possibility is the electrode-width $W_{elect}$, which we examine in FIG. 24A via 2D BPM simulations of the behavior of the TIR X-Switch. Similar behavior is expected for the TIR Y-Switch. Referring to FIG. 24A, the plots of the bar- and cross-state transmission (linear scale) as a function of carrier density for various values of the electrode-width $W_{elect}$, for example, 2, 5, 10, 20 μm, from 2D BPM simulations of the behavior of the TIR X-Switch. TE and TM curves are both included.

Figure 24B:
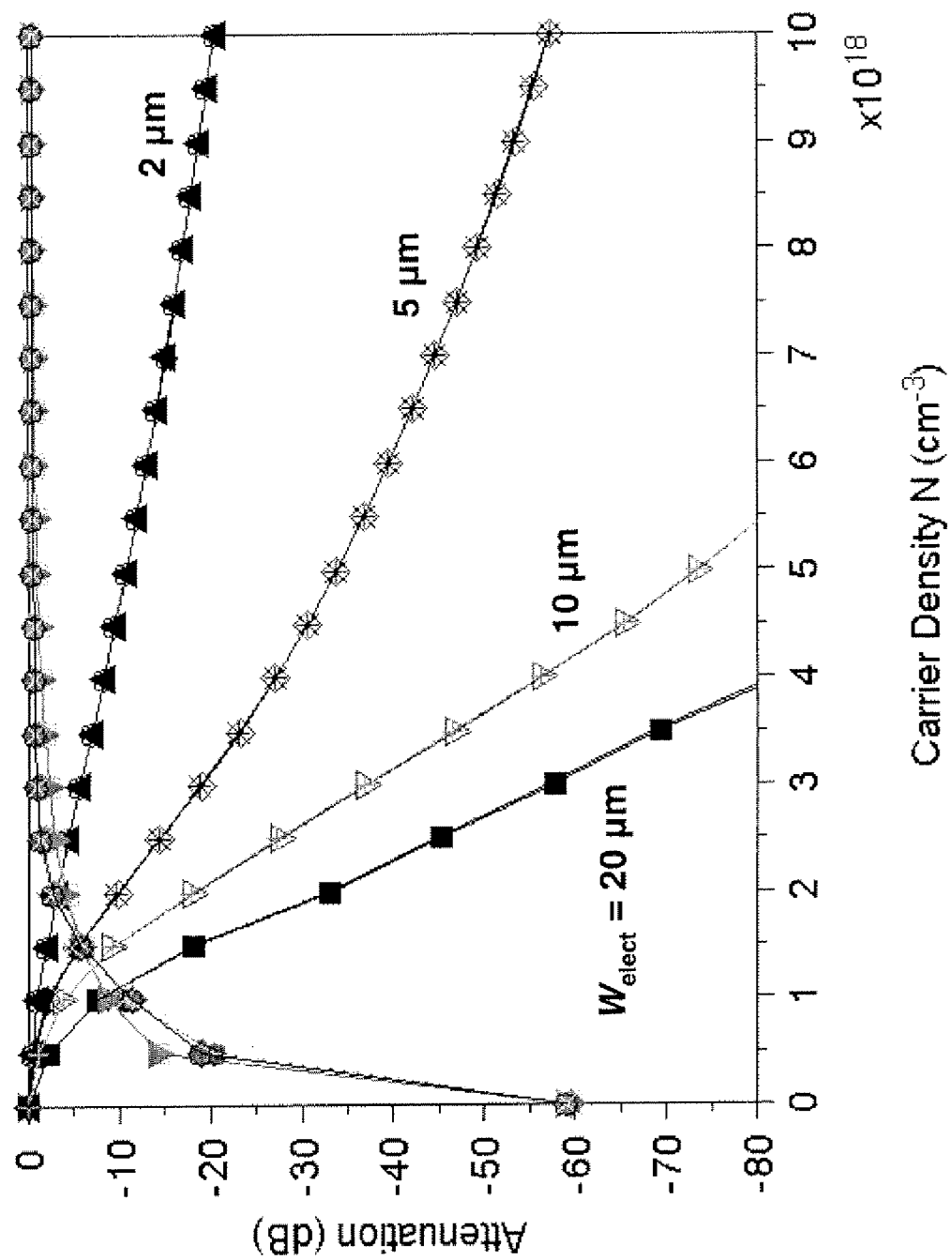

FIG. 24B illustrates the sensitive dependence of the cross-state attenuation upon the electrode-width $W_{elect}$. The maximum value of attenuation reached for the cross state becomes larger than for the bar state for reasonable values of the carrier density when the electrode-width $W_{elect}$ is made large such as 20 μm. Note that this is also consistent with efficient switching, where the minimal amount of generated carrier density is required to switch from the cross to the bar state. Referring to

| crossing half angle $\theta$ | inc. angle $\theta_i$ | m = 1 | | | m = 2 | | | m = 3 | | |
|---|---|---|---|---|---|---|---|---|---|---|
| | | a (μm) | $\theta_b$ | $\theta_d$ | a (μm) | $\theta_b$ | $\theta_d$ | a (μm) | $\theta_b$ | $\theta_d$ |
| 1° | 89° | 166 | 3.5° | 6.9° | 71.1 | 8.0° | 16.0° | 44.0 | 12.8° | 25.6° |
| 2° | 88° | 234 | 2.4° | 4.9° | 81.6 | 7.0° | 14.0° | 48.1 | 11.7° | 23.5° |
| 3° | 87° | 396 | 1.4° | 2.9° | 95.7 | 6.0° | 11.9° | 53.0 | 10.7° | 21.4° |
| 4° | 86° | 1287 | 0.4° | 0.9° | 115.5 | 5.0° | 9.9° | 58.9 | 9.6° | 19.3° |
| 5° | 85° | — | — | — | 145.3 | 3.9° | 7.9° | 66.1 | 8.6° | 17.2° |
| 6° | 84° | — | — | — | 195.5 | 2.9° | 5.9° | 75.3 | 7.6° | 15.1° |
| 7° | 83° | — | — | — | 298.0 | 1.9° | 3.8° | 87.3 | 6.5° | 13.1° |
| 8° | 82° | — | — | — | 624.1 | 0.9° | 1.8° | 103.7 | 5.5° | 11.0° |
| 9° | 81° | — | — | — | — | — | — | 127.4 | 4.5° | 9.0° |
| 10° | 80° | — | — | — | — | — | — | 164.9 | 3.5° | 6.9° |

Exemplary VOA Switching Capability

Figure 22A:
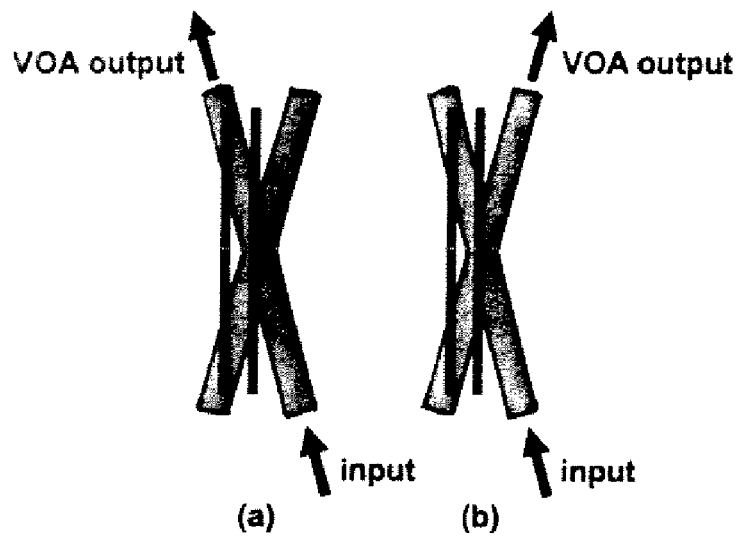
FIGS. 22A and 22B are diagrams illustrating an exemplary optical switch having VOA capability according to one embodiment.
Figure 22B:
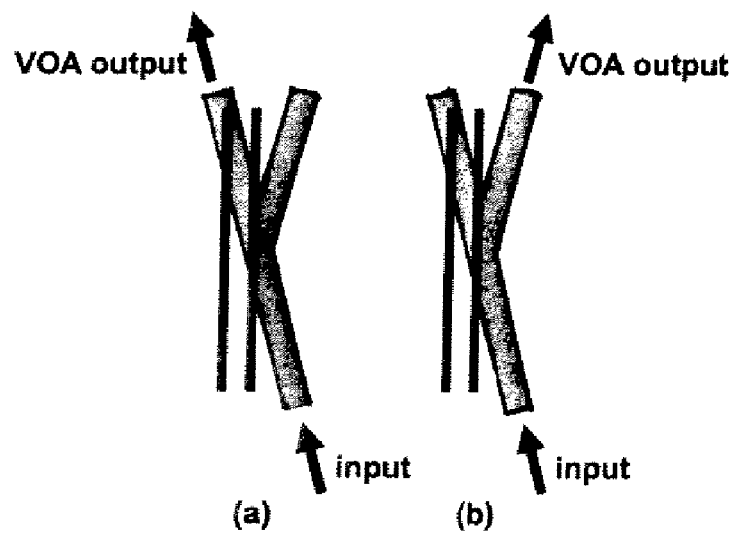

FIGS. 22A and 22B are diagrams illustrating the possible implementations of the TIR X- and Y-Switches as variable optical attenuators (VOAs). Referring to FIGS. 22A and 22B, the cross-state of the TIR X-Switch (bar-state of the TIR Y-Switch) has little or no attenuation (high-transmission) when powered off, which means it is normally transmitting. The bar-state of the TIR X-Switch (cross-state of the TIR Y-Switch) is highly attenuating (opaque) when powered off, which means it is normally blocking.

Referring to FIG. 22A, two possible implementations of the TIR X-Switch as a VOA: (a) Uses the cross state to provide little or no attenuation (high-transmission) when powered off normally transmitting; (b) Uses the bar state to provide high attenuation when powered off, normally blocking.

Referring to FIG. 22B, two possible implementations of the TIR Y-Switch as a VOA: (a) Uses the bar state to provide little or no attenuation (high-transmission) when powered off, normally transmitting. (b) Uses the cross state to provide high attenuation when powered off, normally blocking.

FIG. 23 shows via the use of a dB vertical scale that the attenuation (IL) of the cross state for the TIR X-Switch (bar- FIG. 24B, the plots of the bar- and cross-state attenuation in dB of the TIR X-Switch as a function of carrier density, which shows the sensitive dependence of the cross-state attenuation upon the electrode-width $W_{elect}$. These results are from the same 2D BPM simulations of the behavior of the TIR X-Switch presented in FIG. 24A, where the legend also applies here.

The use of the cross-state output is of interest for some VOA applications. In the case of forming an N×N Crossbar switch, it is the bar state of the TIR X-Switch (cross state of the TIR Y-Switch) that forms the switched and attenuated output. It is anticipated that the attenuation provided by the bar state may be sufficient for most telecommunications applications. Note that the maximum attenuation corresponds to the crosstalk of the waveguide crossing with no applied drive power (e.g., the bias voltage).

Power Tap, VOA, and Switching Capability

Figure 25A:
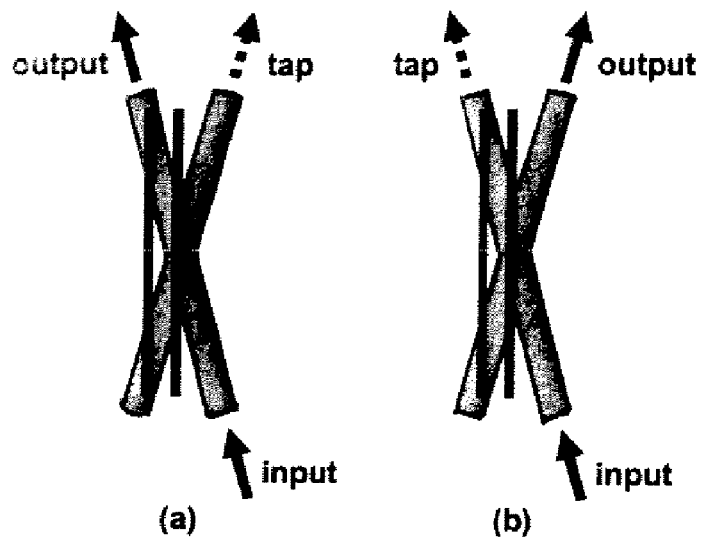
FIGS. 25A and 25B are diagrams illustrating an exemplary optical switch having a tap capability according to another embodiment.
Figure 25B:
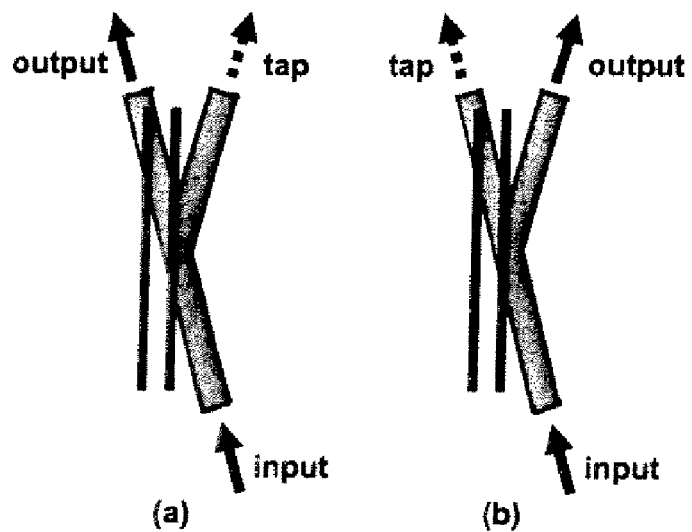

The other output port of the TIR X-Switch or TIR Y-Switch can also function as a tap giving the power of the input signal as depicted in FIGS. 25A and 25B. It is required an initial calibration of the tapped optical power as a percentage of the applied bias voltage (carrier density). Then for any bias voltage, the input optical power can be calculated in firmware on the control board or using additional software. A limit of such an approach stems from the weakest signal that is detectable above the noise limit of the photonic detector.

For the configurations of FIG. 25A (a) and FIG. 25B (a), the drive power (bias voltage) needs to be set high enough in value to achieve a sufficiently large tap signal. In order to reduce the optical loss of the output in FIG. 25A (a) and FIG. 25B (a) the electrode-width $W_{elect}$ should be as small as possible as indicated in FIG. 24B yet maintains the range of attenuation required when also used as a VOA. For the configurations of FIG. 25A (b) and FIG. 25B (b), the drive power (bias voltage) needs to be reduced from the large value that switches the input to the cross-state output of the TIR X-Switch (bar-state output of the TIR Y-Switch). In order to reduce the loss of the tapped optical signal of FIG. 25A (b) and FIG. 25B (b), the electrode-width $W_{elect}$ should again be as small as possible, yet able to provide the desired switching and/or VOA functionality.

Referring to FIG. 25A, TIR X-Switch is used as a VOA as depicted in FIG. 22A with the addition of a tapped output for power monitoring. It is also appropriate for use in forming an N×N Crossbar switch or N×N Matrix Double Crossbar switch with variable optical attenuation and power monitoring. Referring to FIG. 25B, TIR Y-Switch used as a VOA as depicted in FIG. 22B with the addition of a tapped output for power monitoring. It is also appropriate for use in forming an N×N Matrix Double Crossbar switch with variable optical attenuation and power monitoring.

It is anticipated cases where the tapped signal may be too small to be useful for certain values of the desired cross- or bar-state output, since the tapped signal is derived from the opposite output port used for the VOA/switched output. The two output ports/states are related.

Figure 26:
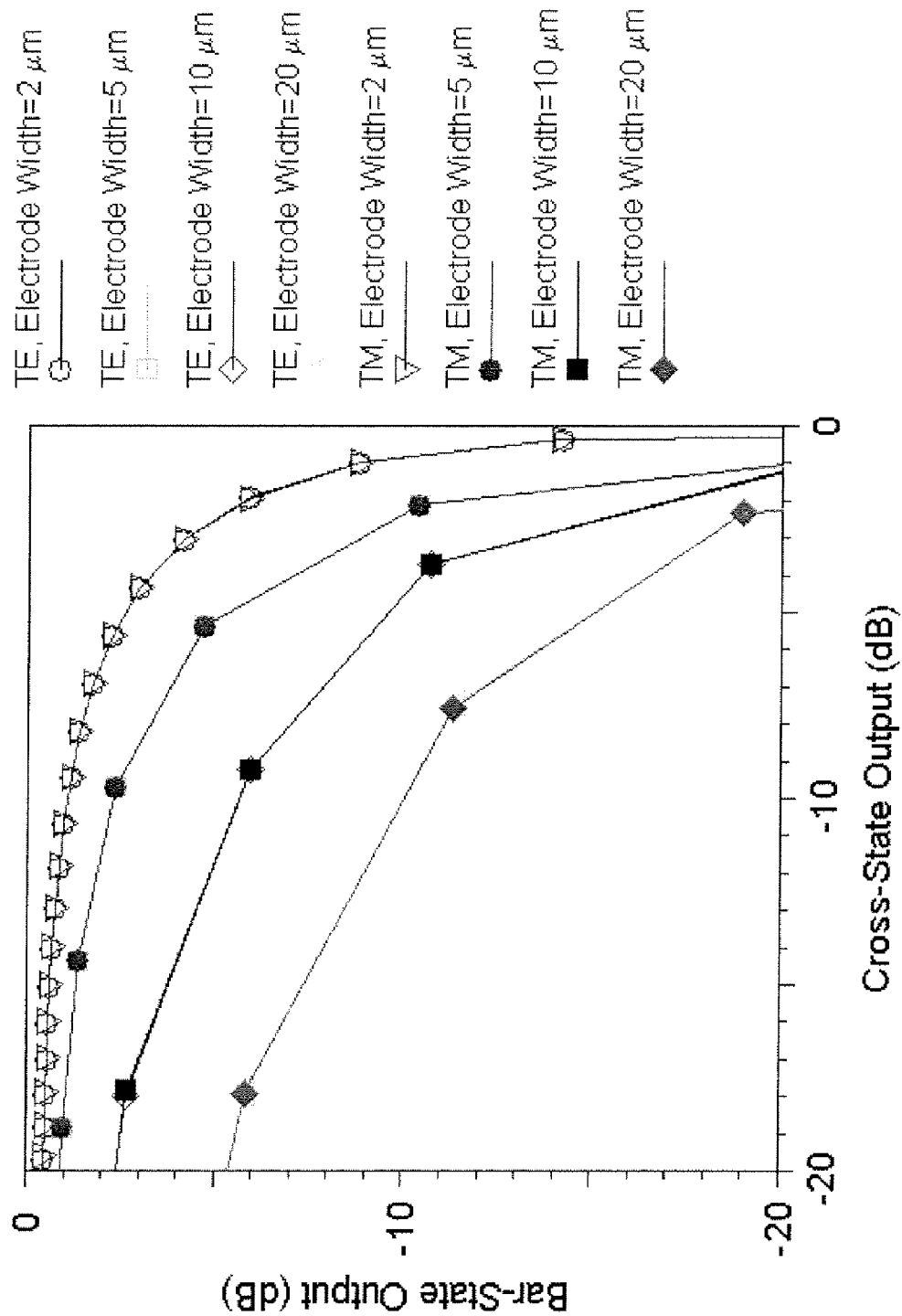
FIG. 26 is a plot illustrating performance of optical switches according to one embodiment.

FIG. 26 is a parametric plot of the bar-state output power in dB plotted versus the cross-state output power in dB, where implicitly it is the carrier-density parameter that is varied. Multiple curves are given, which correspond to cases of different electrode-width $W_{elect}$. The appropriate electrode-width $W_{elect}$ is the one that matches best the overall specifications, where a smaller electrode-width $W_{elect}$ improves the performance of the power tap and a larger electrode-width $W_{elect}$ improves the VOA functionality for certain configurations.

Referring to FIG. 26, parametric plot of the bar- and cross-state output of the TIR X-Switch on dB scales for various values of the electrode-width $W_{elect}$, for example, 2, 5, 10, 20 μm. TE and TM curves are both included.

Figure 27A:
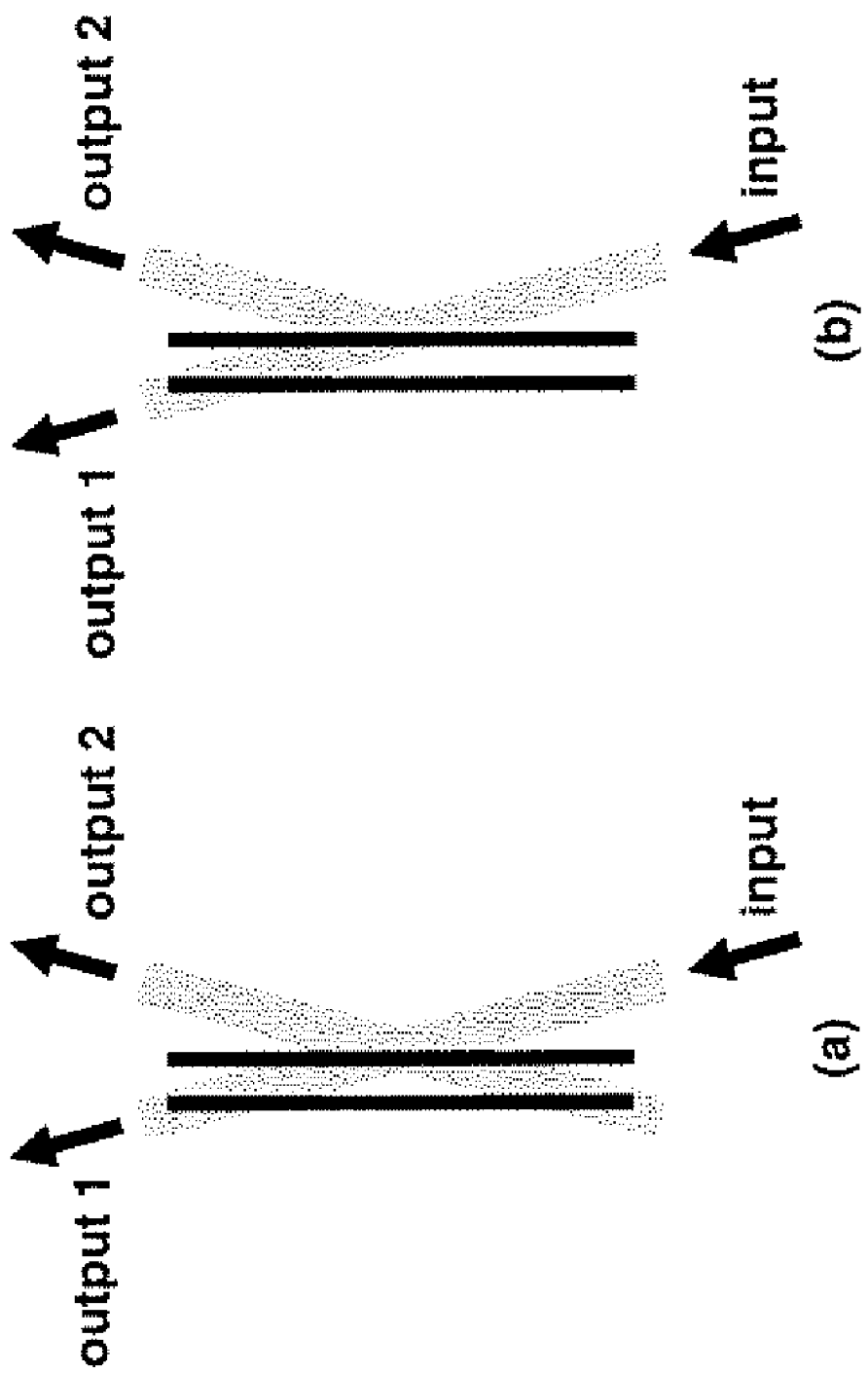
FIG. 27A is a diagram illustrating an exemplary optical switch according to another embodiment.
Figure 27B:
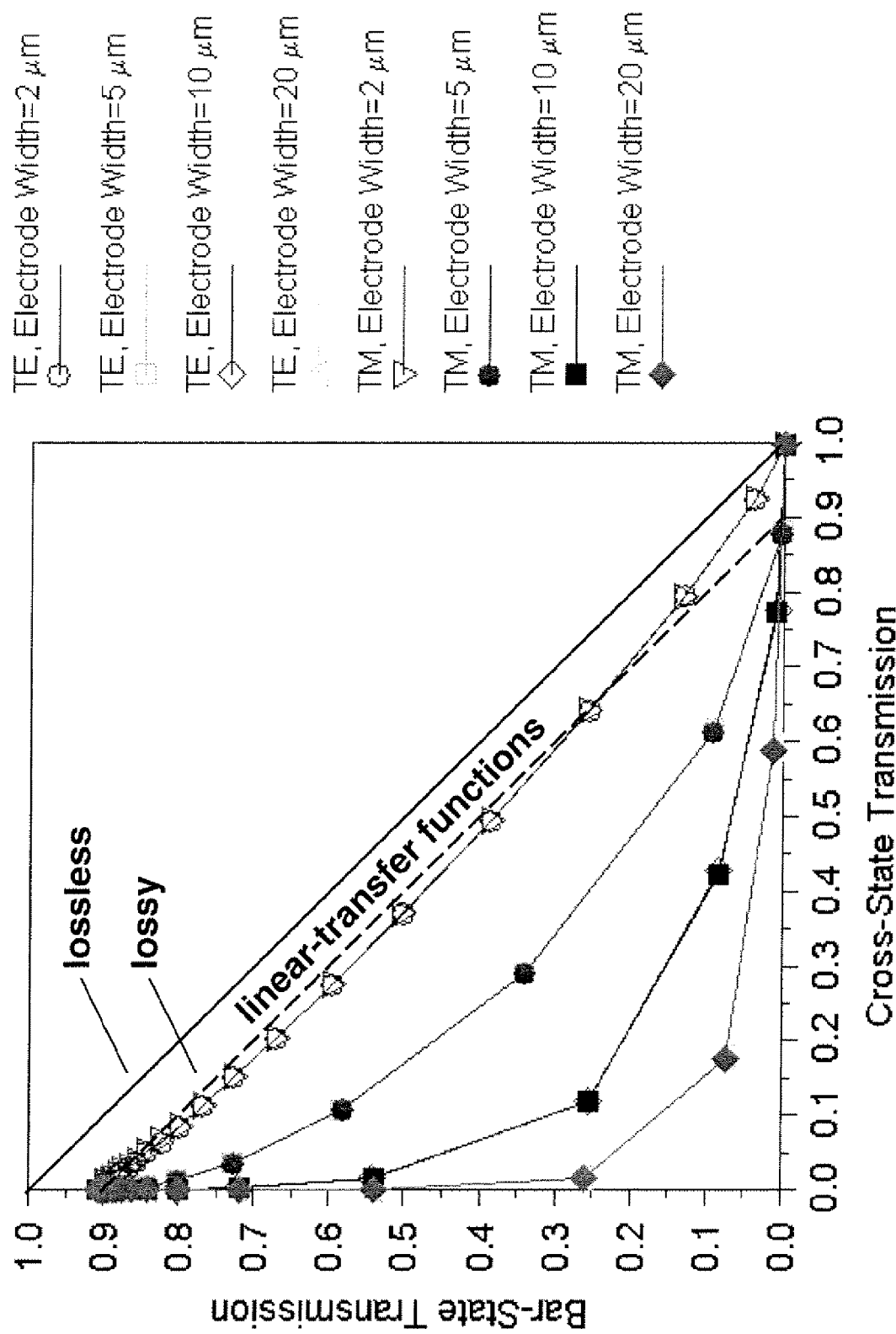
FIG. 27B is a plot illustrating performance of optical switches according to one embodiment.

It is established that the limiting case of the TIR X-Switch as a power splitter (see FIG. 27A) and compare it to a power splitter with no excess loss by plotting in FIG. 27B the parametric curves of FIG. 26 on a linear scale. The smaller the electrode-width $W_{elect}$, the closer the functionality of the TIR X-Switch is to that of a power splitter with linear transfer function. The TIR X-Switch is lossy, though, and also asymmetric in loss between the bar and cross states.

Referring to FIG. 27B, it is shown the limit of a loss-less linear transfer function, which is the limit of a perfect power splitter. It is to be noted that for small values of the electrode width, the efficiency for switching is diminished, meaning larger values of carrier density may be required to achieve switching with minimum IL. Similar behavior may occur for the TIR Y-Switch. Parametric plot of the bar- and cross-state transmission of the TIR X-Switch for various values of the electrode width, for example, 2, 5, 10, 20 μm. TE and TM curves are both included. From large to smaller electrode widths, the transfer function becomes progressively more linear, and approaches the functionality of a perfect power splitter (e.g., lossless linear transfer function), where the cross-state output corresponds to "output 1" and the bar-state output corresponds to "output 2" in FIG. 27A regardless of employing an X or Y structure.

The electrode-width $W_{elect}$, whether taken to be the actual width of the perfect index region in FIG. 15 or taken to be the effective width of the carrier-injection region, determines greatly the performance of the TIR X-Switch for use beyond switching. The electrode-width $W_{elect}$ determines the character of the device as a VOA and as a power tap. It is this insight that enables the design of the TIR X-Switch in Silicon (SOI) and in other material systems employing similar or different optical index control mechanisms. Examples of other embodiments are carrier injection in InP and GaAs, thermo-optic induced index change in polymer and silica (glass), electro-optic effect (linear and quadratic) in Lithium Niobate, Lithium Tantalate, Electro-Optic Polymer, and PLZT.

Figure 28:
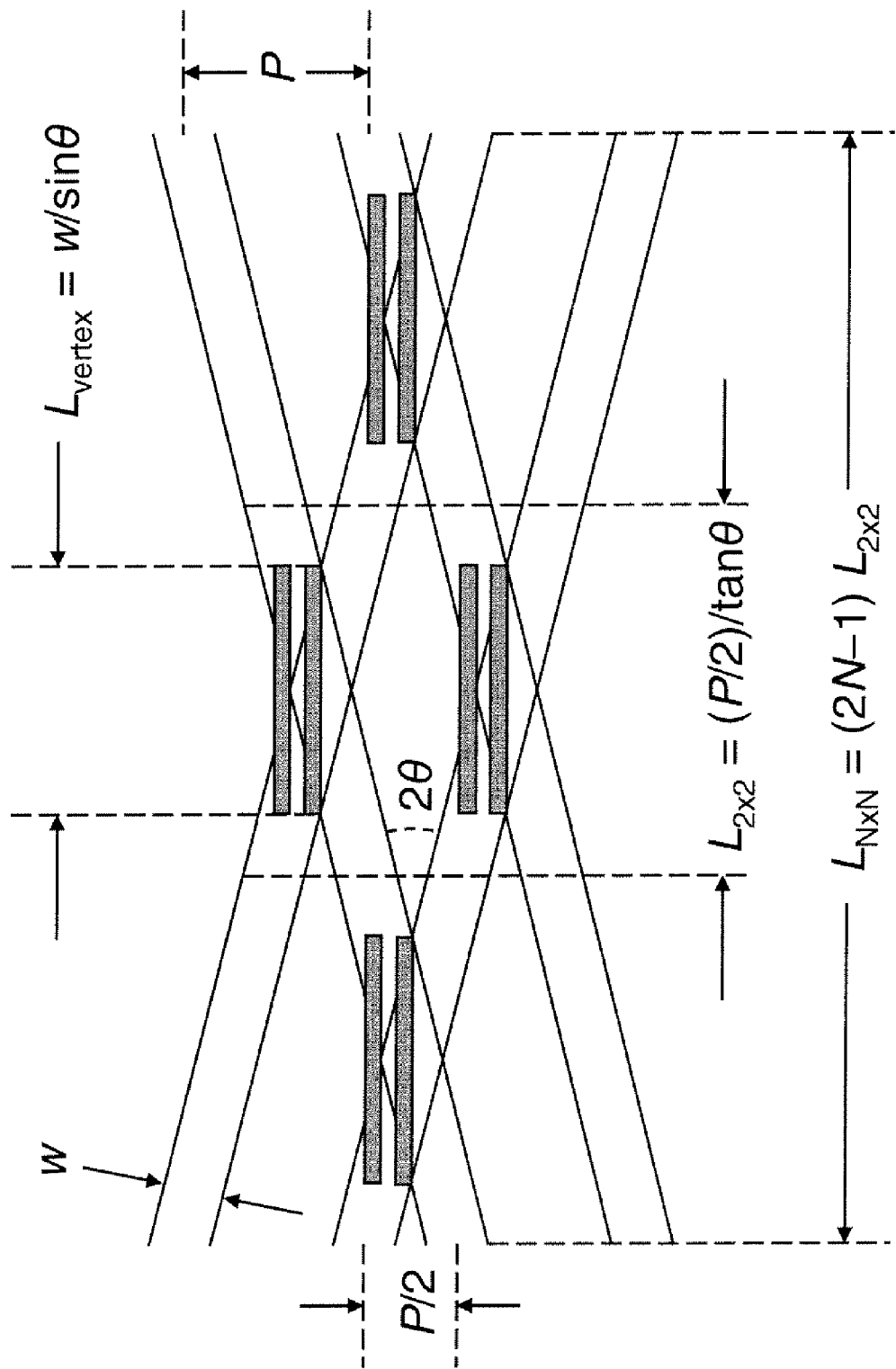
FIG. 28 is a diagram illustrating an exemplary structure of an optical switch according to one embodiment.

FIG. 28 is a diagram illustrating exemplary geometrical parameters that determine the layout and size of an N×N matrix according to one embodiment. Referring to FIG. 28, depicted is the case of a 2×2 Crossbar with coplanar electrodes matched to the vertex length $L_{vertex}$.

Figure 29:
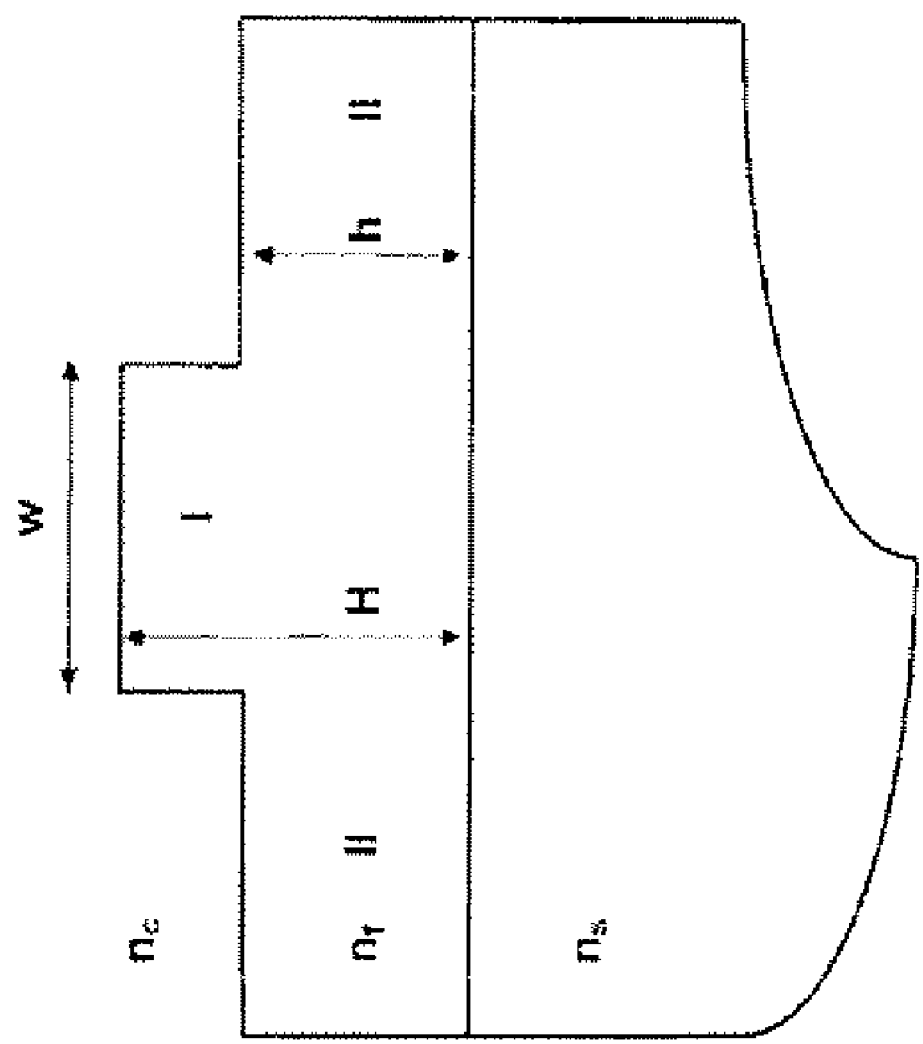
FIG. 29 is a diagram illustrating an exemplary geometry of the ridge region and the slab region of the waveguide according to one embodiment.

FIG. 29 is a diagram illustrating an exemplary geometry of the ridge region and the slab region of the waveguide according to one embodiment. The condition developed by Soref [see R. A. Soref, J. Schmidtchen, and K. Petermann, IEEE J. Quantum Electron., v. 27, n. 8, pp. 1971-1974, 1991] that predicts the occurrence of single and multimode propagation characteristics for large ridge waveguides is $$\frac{W}{H} \leq \alpha + \frac{\frac{h}{H}}{\sqrt{1 - \left(\frac{h}{H}\right)^2}} \tag{10}$$

for the case of $$\frac{h}{H} \geq 0.5, \tag{11}$$

which is the case we are interested. Note that refractive indices do not enter the formula because of an additional assumption essentially that H be much larger than the wavelength. To be clear, the refractive-index case we are considering is $n_f > n_s$ and $n_f \gg n_c$. The numerical-value of the dimensionless parameter α has been considered to be $$\alpha = 0.3, \text{ Soref Condition}, \tag{12}$$

$$\alpha = 0.0, \text{ Strong Condition}. \tag{3}$$

Figure 30:
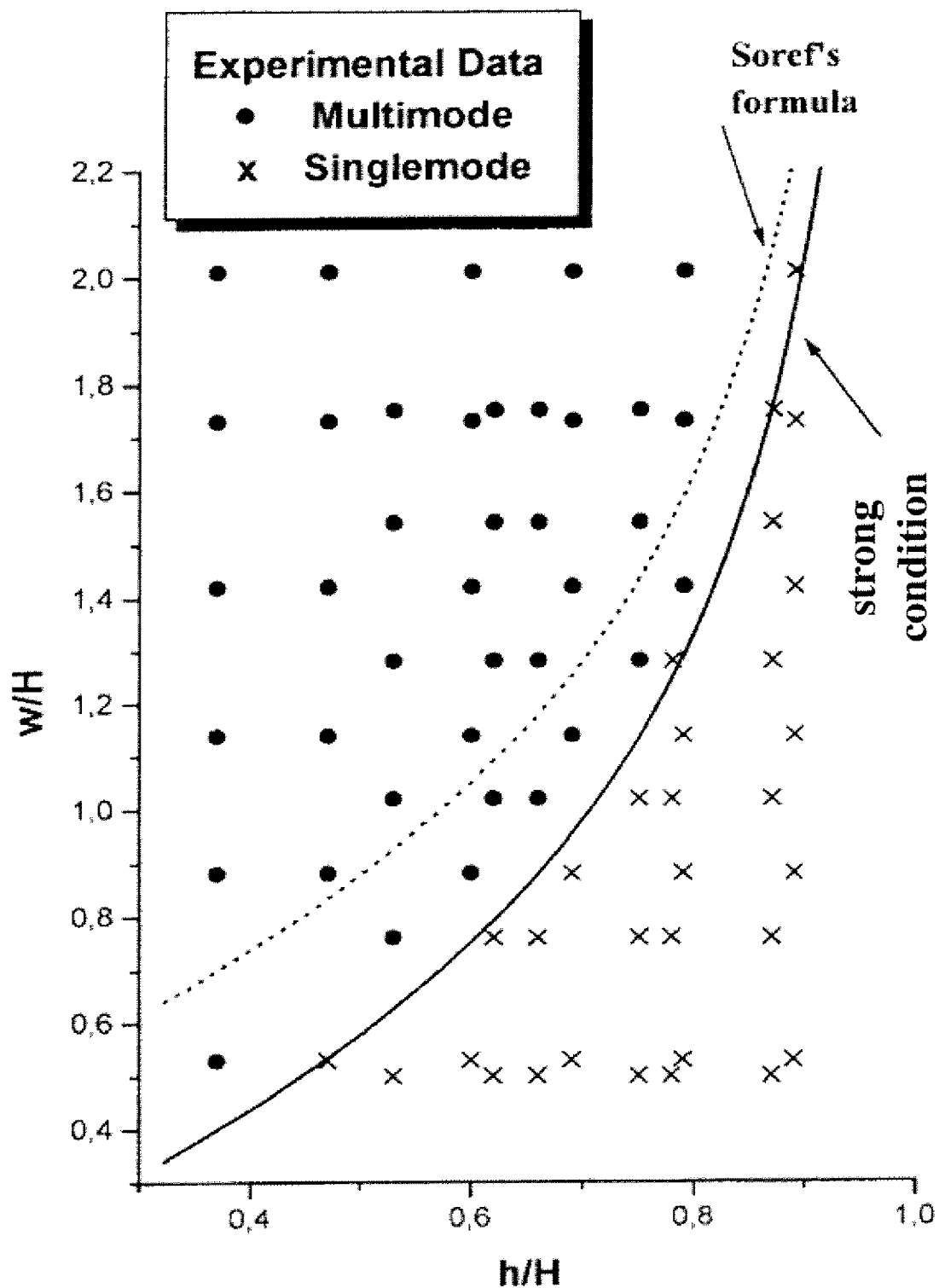
FIGS. 30 and 31 are diagrams illustrating performance of certain formulas according to certain embodiments.

Soref derives the value of 0.3 for α, but some designers have adopted the stronger condition by setting α to zero. FIG. 30 is a diagram illustrating a plot of Eq. (10), but may be regarded for h/H>0.5. Note the relation E=H−h between the etch-depth E, the ridge-height H, and the slab-height h.

For small crossing angles (i.e., θ<<1 radian), the structure at the waveguide crossing of a TIR X-Switch has a width of approximately 2W when the ridge waveguides first meet to form a sharp vertex. To insure a waveguide structure with width 2W supports a single mode, according to one embodiment, we take Eq. 3 and replace W with 2W to arrive at a more restrictive functional condition:

$$\frac{2W}{H} \le \alpha + \frac{\frac{h}{H}}{\sqrt{1-\left(\frac{h}{H}\right)^2}}. \quad (14)$$

Figure 31:
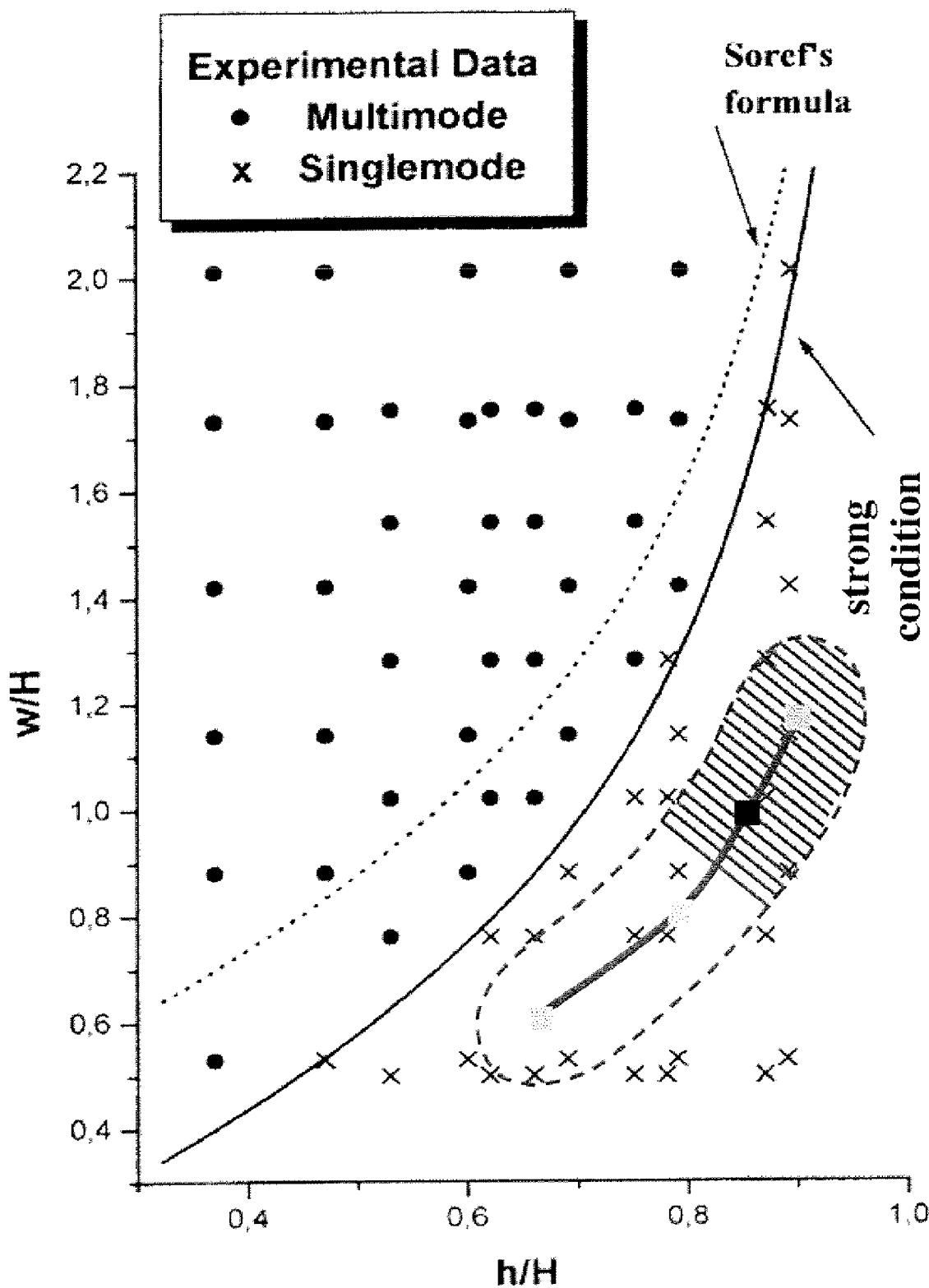

The ridge waveguide with width W is far from supporting higher-order modes. Eq. 14 also serves as our definition of a "weakly confined" large ridge waveguide that has a large mode profile to form a low-loss and low-crosstalk waveguide crossing and hence a TIR X-Switch. The plot of Eq. 14 is shown in FIG. 31, where a suitable region about this condition is indicated. It is to be understood that the desired functionality may persist for parameter values within this region. The preference, though, is for larger relative values of W, which is to reduce the amount of diffraction that occurs within a waveguide crossing. Reduced diffraction may lead to a further reduction in optical loss and crosstalk.

Referring to FIG. 31, overlay of the plot of the more restrictive formula given in Eq. 14 assuming α=0.3 for the boundary line, which is given by the thick and solid line 3101. The dashed outlined region indicates the region where the intended performance persists. The hatch-shaded region 3102 is the preferred region since it corresponds to larger values of W and hence reduced diffraction within the waveguide crossing. The region 3103 is the preferred relative value (h/H, W/H=(0.85, 1.0), and the gray squares are additional relative values of interest, namely, (0.9, 1.2), (0.8, 0.82), and (0.7, 0.64) according to certain embodiments.

According to certain embodiments, the design choice available is the numerical value of the ridge-height H. The numerical value H of approximately 10 µm is appropriate owing to it being compatible with the design of a large ridge waveguide that couples light efficiently to Corning single-mode SMF fiber. Thus, for H=10 µm, the numerical values of interest for (h, W) are approximately (9 µm, 12 µm), (8.5 µm, 10 µm), (8 µm, 8.2 µm), and (7 µm, 6.4 µm), where the preferred values are (8.5 µm, 10 µm). The concept persists for various values of H ranging approximately from 4 µm to 16 µm. For H=4 µm, the numerical values of interest for (h, W) are approximately (3.6 µm, 4.8 µm), (3.4 µm, 4 µm), (3.2 µm, 3.28 µm), and (2.8 µm, 2.6 µm), while for H=16 µm, the numerical values of interest for (h, W) are approximately (14.4 µm, 19.2 µm), (13.6 µm, 16 µm), (12.8 µm, 13.1 µm), and (1.2 µm, 10.2 µm). This analysis is the basis for the numbers summarized in a table further below. It is also useful to make use of the etch-depth ratio E/H=(H−h)/H, but it is should be noted that it is redundant when the slab-height ratio h/H is provided.

Following table illustrates the geometrical implications upon the size of a single 2×2 TIR X-Switch.

TABLE 1

| | Fixed Parameters | | | Dependent Variables | | |
|---|---|---|---|---|---|---|
| N | W (µm) | θ (degrees) | Pitch P (µm) | $L_{2\times2}$ (µm) | $L_{vertex}$ (µm) | $L_{N\times N}$ (cm) |
| 8 | 10 | 1 | 127 | 3638 | 573 | 5.5 |
| 8 | 10 | 2 | 127 | 1818 | 287 | 2.7 |
| 8 | 10 | 3 | 127 | 1212 | 191 | 1.8 |
| 8 | 10 | 4 | 127 | 908 | 143 | 1.4 |

TABLE 1-continued

| | Fixed Parameters | | | Dependent Variables | | |
|---|---|---|---|---|---|---|
| N | W (µm) | θ (degrees) | Pitch P (µm) | $L_{2\times2}$ (µm) | $L_{vertex}$ (µm) | $L_{N\times N}$ (cm) |
| 8 | 10 | 5 | 127 | 726 | 115 | 1.1 |
| 8 | 10 | 6 | 127 | 604 | 96 | 0.9 |
| 8 | 10 | 7 | 127 | 517 | 82 | 0.8 |
| 8 | 10 | 8 | 127 | 452 | 72 | 0.7 |
| 8 | 10 | 9 | 127 | 401 | 64 | 0.6 |
| 8 | 10 | 10 | 127 | 360 | 58 | 0.5 |

According to one embodiment, the appropriate electrode length is related to the mode-profile width when the mode-profile width exceeds the ridge-width W, which corresponds to the case of a weakly confined mode. The maximum electrode length cannot exceed the length of the individual 2×2 TIR X-Switches within the N×N matrix prescribed for a particular value of the pitch P. Thus, we can take the numerical value of the 2×2 length $L_{2\times2}$ to be the upper bound of the electrode length $L_{elect}$. The case of W=10 µm is considered in Table 1, where the ratio $L_{2\times2}/L_{vertex}$ is approximately 6.4. When examining the other cases of the width W ranging approximately from 2.6 µm to 19.2 µm, $L_{2\times2}/L_{vertex}$ are approximately 24.4 and 3.3 respectively.

Note that the TIR X-Switch may have a weak wavelength dependence owing to the small changes in the refractive index (real and imaginary components) in silicon with wavelength. There is no use of interference, which would depend sensitively upon the wavelength of operation and create strong wavelength sensitivity. Thus, 2×2 TIR X-Switch may be used throughout the fiber-communication wavelengths ranging approximately from 1300 nm to 1612 nm, which is the typical approximately 1300-nm isolated wavelength and the S (1491.69-1529.55 nm), C (1529.75-1569.59 nm), and L (1569.80-1611.79 nm) bands, where C is the most prevalent in use.

Referring to Table I shown above, length $L_{vertex}$=W/sin θ of the waveguide crossing measured from vertex to vertex, which depends on the ridge-width W and the crossing half-angle θ; length $L_{2\times2}$=(P/2)/tan θ of each 2×2 TIR X-Switch within the N×N matrix, which depends upon the pitch P of the matrix and the crossing half-angle θ; and overall length $L_{N\times N}$=(2N−1)$L_{2\times2}$ of the N×N matrix, which is given from the case of N=8. The preferred case is marked in bold.

Following Table II illustrates certain parameters that may be used to design an optical switch according to certain embodiments of the invention.

TABLE II

| Parameters | Preferred Embodiment (approximately) | Ranges (approximately) |
|---|---|---|
| Wavelength | 1550 nm | 1300 nm-1612 nm |
| Ratio h/H | 0.85 | 0.7-0.9 |
| Ratio W/H | 1.0 | 0.6-1.2 |
| Ridge-Height H | 10 µm | 4 µm-16 µm |
| Slab-Height h | 8.5 µm | 2.8 µm-14.4 µm |
| Ridge-Width W | 10 µm | 2.6 µm-19.2 µm |
| Etch-Depth-Ratio E/H = (H − h)/H | 0.15 | 0.1-0.3 |
| Half Angle, θ (angle from z-axis) | 3° | 1°-10° |
| Thickness of the Wafer Substrate | 1 mm | 0.4 mm-2 mm |
| Insulator $SiO_2$ | 0.4 µm | 0.3 µm-1 µm |

TABLE II-continued

| Parameters | Preferred Embodiment (approximately) | Ranges (approximately) |
|---|---|---|
| Coplanar-Electrode/Length $L_{elect.}$ | 1000 | 360 μm-3600 μm |
| Ratio $L_{elect.}/L_{vertex}$ | 5 | 1-25 |
| Effective Electrode Width $W_{elect}$ | 5 μm | 1 μm-20 μm |
| Mode-Amplitude In-Plane Full-Width at Half-Maximum (FWHM) Profile Width | 16 μm | 3 μm-32 μm (approximately) |

Note that the parameters shown in Table II are shown for purposes of illustration only. A variety of different parameters may be utilized dependent upon different design requirements.

Thus, optical switches have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An optical switch, comprising:
a first waveguide;
a second waveguide across with the first waveguide in an angle to form an intersection; and
a pair of electrodes placed within a proximity of the intersection to switch a light traveling from the first waveguide to the second waveguide, wherein at least one electrode has at least one protrogen edge that reflects light; wherein the intersection includes a geometry having a ridge width (W), a ridge height (H), and a slab height (h) satisfying the following equation $$\frac{2W}{H} \leq \alpha + \frac{\frac{h}{H}}{\sqrt{1-\left(\frac{h}{H}\right)^2}},$$

wherein α is ranging from approximately 0.0 to 0.3.

2. The optical switch of claim 1, wherein the intersection is formed having a doping profile layer and a metallization profile layer.

3. The optical switch of claim 1, wherein H is ranging from approximately 4 μm to 16 μm.

4. The optical switch of claim 1 wherein a slab height ratio of h/H is ranging from approximately 0.7 to 0.9.

5. The optical switch of claim 1, wherein a ratio of W/H is ranging from approximately 0.64 to 1.0.

6. The optical switch of clam 1, wherein the pair of electrodes have a small crossing angle.

7. The optical switch of claim 6, wherein the small crossing angle is less than one radian.

8. The optical switch of claim 1, wherein an electrode length of one of the pair of electrodes is related to a mode-profile width, wherein the mode-profile width exceeds W.

9. The optical switch of claim 1, wherein the first and second waveguides form an X-switch.

10. The optical switch of claim 9, wherein a cross state of the X-switch provide little or no attenuation when powered off and transmits light.

11. The optical switch of claim 9, wherein a bar state of the X-switch provide high attenuation when powered off and blocks light.

12. The optical switch of claim 1, wherein the first and second waveguides form a Y-switch.

13. The optical switch of claim 12, wherein a bar state of the Y-switch provide little or no attenuation when powered off and transmits light.

14. The optical switch of claim 12, wherein a cross state of the Y-switch provide high attenuation when powered off and blocks light.

15. The optical switch of claim 1, further comprising:
an output port that acts as a tap giving power of an input signal.

* * * * *